(12) United States Patent
Presley et al.

(10) Patent No.: US 7,826,697 B2
(45) Date of Patent: Nov. 2, 2010

(54) SYSTEM AND METHOD FOR ASYMMETRICAL FIBER SPACING FOR WAVELENGTH SELECTIVE SWITCHES

(75) Inventors: Harry W. Presley, Suwanee, GA (US); Michael L. Nagy, Lawrenceville, GA (US)

(73) Assignee: Olympus Corporation (JP)

( * ) Notice: Subject to any disclaimer, the term of this patent is extended or adjusted under 35 U.S.C. 154(b) by 0 days.

(21) Appl. No.: 12/194,397

(22) Filed: Aug. 19, 2008

(65) Prior Publication Data

US 2010/0046884 A1 Feb. 25, 2010

(51) Int. Cl.
*G02B 6/26* (2006.01)
*G02B 6/42* (2006.01)

(52) U.S. Cl. .............. 385/18; 385/16; 385/17; 385/19; 385/20; 385/21; 385/22; 385/24; 385/31; 385/39; 385/47; 385/50

(58) Field of Classification Search .......... 385/16, 385/17, 18, 19, 20, 21, 22, 24, 31, 39, 47, 385/50
See application file for complete search history.

(56) References Cited

U.S. PATENT DOCUMENTS

| | | |
|---|---|---|
| 6,259,835 B1 | 7/2001 | Jing |
| 6,259,841 B1 * | 7/2001 | Bhagavatula ............. 385/47 |
| 6,393,187 B1 | 5/2002 | Engelberth et al. |
| 6,418,247 B1 * | 7/2002 | Presley ................... 385/18 |
| 6,543,286 B2 | 4/2003 | Garverick et al. |
| 6,574,388 B2 | 6/2003 | Laor |
| 6,594,415 B1 * | 7/2003 | Cappiello et al. ......... 385/24 |
| 6,618,519 B2 | 9/2003 | Chang et al. |
| 6,694,073 B2 | 2/2004 | Golub et al. |
| 6,697,557 B2 | 2/2004 | Mukherjee et al. |
| 6,705,165 B2 | 3/2004 | Garverick et al. |
| 6,782,153 B2 | 8/2004 | Polinsky et al. |
| 6,788,981 B2 | 9/2004 | Garverick et al. |
| 6,798,941 B2 | 9/2004 | Smith et al. |
| 6,842,555 B2 | 1/2005 | Bhattacharya et al. |
| 6,842,556 B2 | 1/2005 | Reznichenko |
| 6,934,440 B2 | 8/2005 | Dejima et al. |
| 6,980,712 B2 | 12/2005 | Huang et al. |
| 7,024,090 B2 | 4/2006 | Jeantilus et al. |
| 7,149,399 B2 | 12/2006 | Meder et al. |

(Continued)

FOREIGN PATENT DOCUMENTS

WO WO/2008/057347 5/2008

OTHER PUBLICATIONS

U.S. Appl. No. 60/260,749, filed Jan. 10, 2001, Rajan, et al.

(Continued)

*Primary Examiner*—Ryan Lepisto
(74) *Attorney, Agent, or Firm*—Balser & Grell IP Law; Mathew L. Grell

(57) ABSTRACT

A system and method of asymmetrical fiber or waveguide spacing comprising, in general, an asymmetrical fiber concentrator array (FCA), wherein an offset in the front face spacing of the output waveguides relative to the input waveguides functions to reduce or eliminate the introduction of static back reflection, and static in-to-in crosstalk into a fiber by an optical switch, but does not impose the cost, complexity, and insertion loss penalties brought about by additional components.

40 Claims, 15 Drawing Sheets

U.S. PATENT DOCUMENTS

| | | |
|---|---|---|
| 7,233,715 B2 | 6/2007 | Kazama et al. |
| 2002/0001429 A1 | 1/2002 | Milanese et al. |
| 2002/0164114 A1* | 11/2002 | Golub et al. .................. 385/18 |
| 2003/0068121 A1* | 4/2003 | Matsuura et al. .............. 385/24 |
| 2004/0067014 A1* | 4/2004 | Hollars et al. ................. 385/33 |
| 2004/0234226 A1 | 11/2004 | Jeantilus et al. |
| 2007/0081762 A1* | 4/2007 | Sugiyama et al. ............. 385/18 |
| 2009/0220233 A1* | 9/2009 | Presley et al. ................. 398/79 |

OTHER PUBLICATIONS

U.S. Appl. No. 11/975,242, filed Oct. 18, 2007, Presley, et al.

* cited by examiner

SYSTEM AND METHOD FOR ASYMMETRICAL FIBER SPACING FOR WAVELENGTH SELECTIVE SWITCHES

TECHNICAL FIELD

The present apparatus, system and method relates generally to optical communications, and more specifically relates to fiber port arrays, a component of an optical switch used in multi-channel optical communications networks and applications in the field of switches for high-speed computing and supercomputing.

BACKGROUND ART

Modern communications networks are increasingly based on silica optical fiber which offers very wide bandwidth within several spectral wavelength bands. In recent developments, the transmission capacity of fiber optic systems has been greatly increased by wavelength division multiplexing (WDM), wherein multiple independent optical signals, differing uniquely by wavelength, are simultaneously transmitted over the fiber optic link. For example, the C-band transmission window has a bandwidth of about 35 nanometers, determined partly by the spectral amplification bandwidth of an erbium-doped fiber amplifier (EDFA) amplifier, in which multiple wavelengths may be simultaneously transmitted. All else being equal, for a WDM network containing N number of wavelengths, the data transmission capacity of the link is increased by a factor of N. Dense WDM (DWDM) systems are being designed wherein the transmission spectrum includes 40, 80, or more wavelengths with wavelength spacing of less than 1 nanometer. Current designs have wavelength spacing of between 0.4 and 0.8 nanometer or equivalently a frequency spacing of 50 to 100 GHz respectively.

In a modern fiber optic switch of a sophisticated wavelength switching all-optical network, the wavelength components W from an incoming multi-wavelength fiber are de-multiplexed into different spatial paths. Switching elements then route the wavelength-separated signals toward the desired output fiber port before a multiplexer aggregates the optical signals of differing wavelengths onto a single outgoing fiber. In conventional fiber switching systems, all the fiber optic switching elements and associated multiplexers and de-multiplexers are incorporated into a wavelength selective switch (WSS), a specially enhanced optical cross connect (OXC) having a dispersive element and wavelength-selective capability. Additionally, such systems incorporate lenses and mirrors to focus and reflect light, and lenslets which collimate such light.

Input and output optical fibers coupled to the fiber optic switch may be bundled or coupled and concentrated in a fiber port array to secure multiple fibers in a selected position and/or orientation. While the term optical fiber will henceforth be used exclusively with reference to the means of conducting an optical signal to and from the fiber port array, it should be understood that optical fiber(s), waveguide(s), or combination thereof may be implemented to provide an optical input signal to a free-space interface, and to receive an optical output signal therefrom. Typically, each of the optical fibers is substantially aligned parallel with the others, defining a switching plane. Furthermore, each of optical fibers comprises a termination point defining an interface with free-space, wherein optical signals propagating within an optical fiber and/or a waveguide within the fiber port array may exit the fiber and/or waveguide, and propagate through free-space. Internally within said fiber port array are waveguides, utilized to bring the respective optical signals of said fibers closer together on an output face on the other end of the fiber port array in an effort to send the optical signals into, and receive them from free space in a close configuration.

This close configuration of input and output fibers in the switching plane, combined with reflective fiber optic switching elements, often results in the introduction of static back reflection (return loss) and in-to-in crosstalk (coupling) into an optical switch. Back reflection is a measure of optical signal reflected by a fiber optic switching element from an optical fiber back towards the source, into the same optical fiber. In-to-in crosstalk refers to a switching element configuration intending one coupling outcome between optical fibers but further creating an undesired coupling effect between one or more other input optical fibers.

Moreover, fiber optic transmission systems use lasers and amplifiers to transmit signals over optical fiber. These components can be sensitive to light returning into them. A high back reflection or in-to-in crosstalk can prevent such a laser from transmitting correctly.

Prior art for preventing the introduction of static back reflection and in-to-in crosstalk into an optical switch relied upon introduction of an optical isolator in each optical fiber path. An optical isolator is an optical component which allows the transmission of light in only one direction, thus, preventing unwanted feedback into the fiber, such as back reflection, return loss and crosstalk. However, adding optical isolators to each fiber in a multi-fiber switch adds additional cost, installation time, and insertion loss (the measure of power lost due to imperfections in an optical communication link due to discontinuities, such as splicing and junctions required to insert the isolator), especially as the port count of optical switches increases.

Additional prior art for resolving dynamic back reflection or in-to-in crosstalk includes optical switches utilizing dual-axis tilting mirrors to eliminate momentarily produced dynamic crosstalk. For example, when an optical switch selectively connects an optical signal from a selected input port to a selected output port, the most apparent method of readjusting the mirrors would change the mirror angles about the switching axis, whereby any optical power emanating from the input port's waveguide is swept along a line from the previously selected output waveguide to the new selected output waveguide. However, at some time during the sweep, the optical power couples into the intermediate waveguide(s) that lie therebetween, but are not involved in either of the connections. Optical power spuriously induced in the intermediate waveguide(s) momentarily produces crosstalk in the intermediate waveguide(s). A prior art solution to dynamic crosstalk resulting from waveguides being disposed along a line on the output face of the fiber port array is to utilize dual-axis tilting mirrors to cause the switching beam to follow an offset path involving first a cross-axis tilt in the wavelength direction away from the line containing waveguide faces, a second switching axis tilt in the fiber direction, and a third cross-axis tilt back toward the waveguide face, to steer the beam to become coincident with the desired output waveguide while avoiding the intermediate waveguide(s).

Nonetheless, it is clear that there is an unmet need for a system and method for an improved optical fiber/waveguide arrangement that functions to reduce static back reflection, crosstalk and other stray light, but does not impose the cost, complexity, and insertion loss penalties brought about by additional components.

BRIEF SUMMARY

Briefly described in a preferred embodiment, the present apparatus, system, and method overcomes the above-mentioned disadvantages and meets the recognized need for an optical switch by providing an apparatus, system, and method for asymmetrical fiber, waveguide, or aperture spacing comprising, in a generally preferred manner, an asymmetrical fiber concentrator array (FCA), wherein an offset in the front face spacing of the output waveguide apertures relative to the other N input waveguides' apertures functions to reduce or eliminate the introduction of static back reflection and static in-to-in crosstalk into an optical fiber by an optical switch, but does not impose the cost, complexity, and insertion loss penalties brought about by additional components.

According to its major aspects and broadly stated, the asymmetrical fiber concentrator (port) array (FCA) in its preferred form comprises an FCA having a center-to-center spacing asymmetry between the output port waveguide face and the neighboring input port waveguide faces.

More specifically, the preferred embodiment of the system and method for asymmetrical optical fiber, waveguide, or aperture spacing comprises an FCA having waveguides adapted to couple with optical fibers on one end in a selected position and/or orientation, and waveguides disposed throughout the FCA and terminating along the facial axis of the output face of the FCA, preferably defining a switching plane, and comprising a one-dimensional array having a termination point defining an interface with free-space, wherein optical signals propagating within an optical fiber and into a waveguide may exit the optical fiber and waveguide via an aperture, and propagate through free-space. Preferably, a switching element of the WSS is adapted to direct a selected optical signal from a selected one of a plurality of input fiber ports to a single output fiber port (an N input×1 output switch). Each waveguide's free-space termination of the N×1 switch comprises a center-to-center symmetrical spacing; however, by introducing a spacing asymmetry between the output port waveguide free-space aperture center-to-center and both neighboring input port waveguide free-space apertures, a reduction or elimination of static back reflection from an optical fiber into itself, and static in-to-in crosstalk between input optical fibers beneficially occurs.

Specifically, the preferred embodiment introduces a spacing offset in the FCA of an additional 6 micrometers in the center-to-center distance between the output port waveguide's free-space termination aperture, and one neighboring input port waveguide's free-space termination aperture. All remaining waveguide aperture center-to-center spacing remains symmetrical such as between the other input ports and the other side of the output port and its neighboring input port. Such one sided additional spacing asymmetry results in a static return loss (sRL) increase, static back reflection reduction and static in-to-in crosstalk (coupling) (sI-I) reduction of approximately 40 dB.

A preferred embodiment is an optical device comprising a guiding member, a first row of apertures disposed on at least one side of the guiding member serving as an interface for connecting one or more input optical fibers and one output fiber to the guiding member, a second row of apertures disposed on another side of the guiding member serving as a free-space interface for optical signals of the one or more input optical fibers and the one output fiber, three or more waveguides, wherein said apertures of said second array of apertures are predominately equally spaced relative to one another, wherein one or more apertures of said second array of apertures, corresponding to said one or more output fibers, has unequal spacing relative to said predominately equally spaced apertures of said second array.

An alternate embodiment is an optical device comprising a bundle of fibers whose terminations serve as a free-space interface for optical signals, from one or more input optical fibers and one or more output fibers, wherein the terminations of the bundle of optical fibers forms an array of predominately equally spaced apertures, and wherein the terminations of the bundle of fibers corresponding to the one or more output fibers, are offset relative to the equally spaced apertures.

Another alternate embodiment is a two-dimensional optical device comprising a guiding member; a first array of apertures arranged in a plurality of rows disposed on at least one side of the guiding member and serving as an interface for connecting one or more input optical fibers and one or more output optical fibers to the guiding member; a second array of apertures arranged in a plurality of rows disposed on another side of the guiding member and serving as a free-space interface for optical signals of the one or more input optical fibers and the one or more output fibers; three or more waveguides per row, wherein each waveguide connects one of the first array of apertures with one of the second array of apertures; wherein the second array of apertures are predominately equally spaced relative to one another within each row; and wherein one of the second array of apertures corresponding to the one or more output fibers has an unequal spacing relative to the predominately equally spaced apertures.

Yet another alternate embodiment is a two-dimensional optical device comprising a guiding member, a first array of apertures arranged in a plurality of rows disposed on at least one side of the guiding member and serving as an interface for connecting rows of one or more input fibers and one or more output fibers to the guiding member, a second array of apertures arranged in a plurality of rows disposed on another side of the guiding member and serving as a free-space interface for optical signals of the rows of one or more input fibers and the one or more output fibers, and three or more waveguides per row, wherein each waveguide connects at least one aperture of the first array of apertures with at least one aperture of the second array of apertures, wherein the apertures of said second array of apertures are predominately equally spaced relative to one another within each row, and wherein the one or more apertures of the second array of apertures, corresponding to the one or more output fibers, has unequal spacing relative to the predominately equally spaced apertures.

Yet another alternate embodiment is an optical system comprising a guiding member comprising a first array of apertures disposed on at least one side of the guiding member and serving as an interface for connecting one or more input fibers and one or more output fibers to the guiding member, a second array of apertures disposed on another side of the guiding member and serving as a free-space interface for optical signals of the one or more input fibers and the one or more output fibers, and three or more waveguides, wherein each waveguide connects at least one aperture of the first array of apertures to at least one aperture of the second array of apertures, wherein the apertures of the second array of apertures are predominately equally spaced relative to one another, wherein one or more apertures of the second array of apertures, corresponding to the one or more output fibers, has unequal spacing relative to the predominately equally spaced apertures; a switching element for receiving at least one of the optical signals from one or more input fiber ports and for switching at least one of the optical signals from one of the one or more input fiber ports to one or more output fiber ports according to a state of said switching element, and one or more optical elements, wherein each optical element focuses the optical signals of one or more input fiber ports and one or more output fiber ports.

Yet another alternate embodiment is an optical system comprising a guiding member comprising a first array of apertures arranged in a plurality of rows disposed on at least one side of a guiding member and serving as an interface for connecting rows of one or more input fibers and one or more output fibers to the guiding member, a second array of apertures arranged in a plurality of rows disposed on another side of the guiding member and serving as a free-space interface for optical signals of the rows of one or more input fibers and the one or more output fibers, and three or more waveguides, wherein each waveguide connects at least one aperture of the first array of apertures with at least one aperture of the second array of apertures, wherein said apertures within each row of the plurality of rows of the second array of apertures are predominately equally spaced relative to one another, wherein the one or more apertures of the second array of apertures in each row of the plurality of rows, corresponding to the one or more output fibers, has unequal spacing relative to the predominately equally spaced apertures, a wavelength dispersive element for spatially separating at least one wavelength of the input optical signal from at least one other wavelength of the input optical signal and for recombining at least one wavelength of the output optical signal with at least one other wavelength of the output optical signal, a switching element for receiving at least one wavelength from the one or more input fiber ports of a row of the plurality of rows and for switching at least one wavelength from one of the one or more input fiber ports to the one or more output fiber ports according to a state of the switching element, and one or more optical elements, wherein each optical element focuses the optical signals of the one or more input fiber ports and the one or more output fiber ports.

Yet another alternate embodiment is a method for making a device having a desired configuration, the method comprising the steps of (1) forming in a guiding member a first array of apertures disposed on at least one side of the guiding member, the first array of apertures serving as an interface for connecting one or more input fibers and one or more output fibers to the guiding member, (2) forming in the guiding member a second array of apertures disposed on another side of the guiding member, the second array of apertures serving as a free-space interface for optical signals of the one or more input fibers and the one or more output fibers, and (3) filling the guiding member with one or more waveguides, wherein each waveguide connects one of the first array of apertures with one of the second array of apertures, wherein the second array of apertures are predominately equally spaced relative to one another, and wherein one or more apertures of the second array of apertures has unequal spacing relative to the predominately equally spaced apertures, said one or more unequally spaced apertures corresponding to the one or more output fibers.

Yet another alternate embodiment is a method for increasing static return loss, reducing static back reflection and static in-to-in crosstalk into an optical switch, the method comprising the steps of (1) providing a guiding member comprising a first array of apertures disposed on at least one side of the guiding member serving as an interface for connecting one or more input fibers and one or more output fiber into the guiding member, a second array of apertures disposed on another side of the guiding member serving as a free-space interface for optical signals of the one or more input fibers and the one or more output fibers, and three or more waveguides, wherein each the waveguide connects at least one aperture of the first array of apertures with at least one aperture of the second array of apertures, (2) spacing the second array of apertures predominantly equally relative to one another, (3) spacing at least one aperture of the second array of apertures corresponding to the one or more output fibers unequally relative to said predominately equally spaced apertures (4) transmitting in free-space one or more optical signals of the one or more input fibers to an optical switching element, (6) switching at least one optical signal of the one or more optical signals of the one or more input apertures to the one or more output apertures, and (7) receiving an optical signal from the optical switching element for transmission to the one or more output fibers.

Accordingly, a feature of the present FCA is its ability to reduce static back reflection, and static in-to-in crosstalk entering into an optical fiber as a result of unintended optical switch connecting, but does not impose the cost, complexity, and insertion loss penalties brought about by additional components.

Another feature of the present FCA is its simplicity of implementation for rejection of stray optical signals.

Yet another feature of the present FCA is its ability to reduce overall MEMS mirror tilt angle requirements, thus lowering the required drive voltage, simplifying MEMS fabrication and reducing heat generated by the MEMS mirror array.

Yet another feature of the present FCA is its ability to enable symmetrical +/− MEMS mirror tilt range for better distribution of digital control voltage, enabling finer tilt angle resolution and smaller controlled loss increments or power equalization.

Yet another feature of the present FCA is its ability to reduce static back reflection and static in-to-in crosstalk entering into an optical fiber, thereby, reducing light returning into upstream network elements such as lasers or amplifiers, and eliminating or reducing damage to upstream components and/or bit errors due to back reflection or in-to-in crosstalk.

Yet another feature of the present FCA is its ability to eliminate introducing an optical isolator in each optical fiber path.

These and other features of the present apparatus, system, and method will become more apparent to those ordinarily skilled in the art after reading the following Detailed Description of the Preferred and Selected Alternate Embodiments and Claims in light of the accompanying drawing Figures.

BRIEF DESCRIPTION OF THE DRAWINGS

Accordingly, the present apparatus, system, and method will be understood best through consideration of, and with reference to, the following drawings, viewed in conjunction with the Detailed Description of the Preferred and Selected Alternate Embodiments referring thereto, in which like reference numerals denote similar structure and refer to like elements throughout, and in which.

It is to be noted that the drawings presented are intended solely for the purpose of illustration and that they are, therefore, neither desired nor intended to limit the invention to any or all of the exact details of construction shown, except insofar as they may be deemed essential to the claimed invention.

DETAILED DESCRIPTION OF THE PREFERRED AND SELECTED ALTERNATE EMBODIMENTS

In describing preferred and selected alternate embodiments of the present apparatus, system, and method, as illustrated in FIGS. 1-8, specific terminology is employed for the sake of clarity. The apparatus, system, and method, however, are not intended to be limited to the specific terminology so selected, and it is to be understood that each specific element includes all technical equivalents that operate in a similar manner to accomplish similar purpose.

Figure 1:
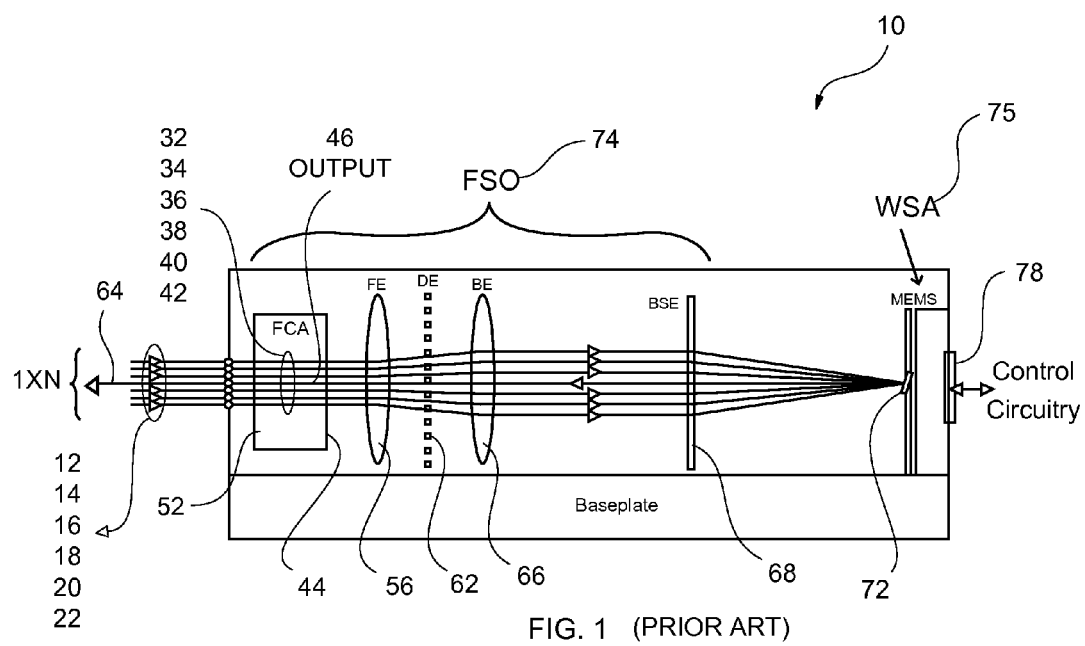
FIG. 1 is a schematic illustration of an exemplary six input fiber port by one output fiber port wavelength selective switch (WSS)
Figure 3:
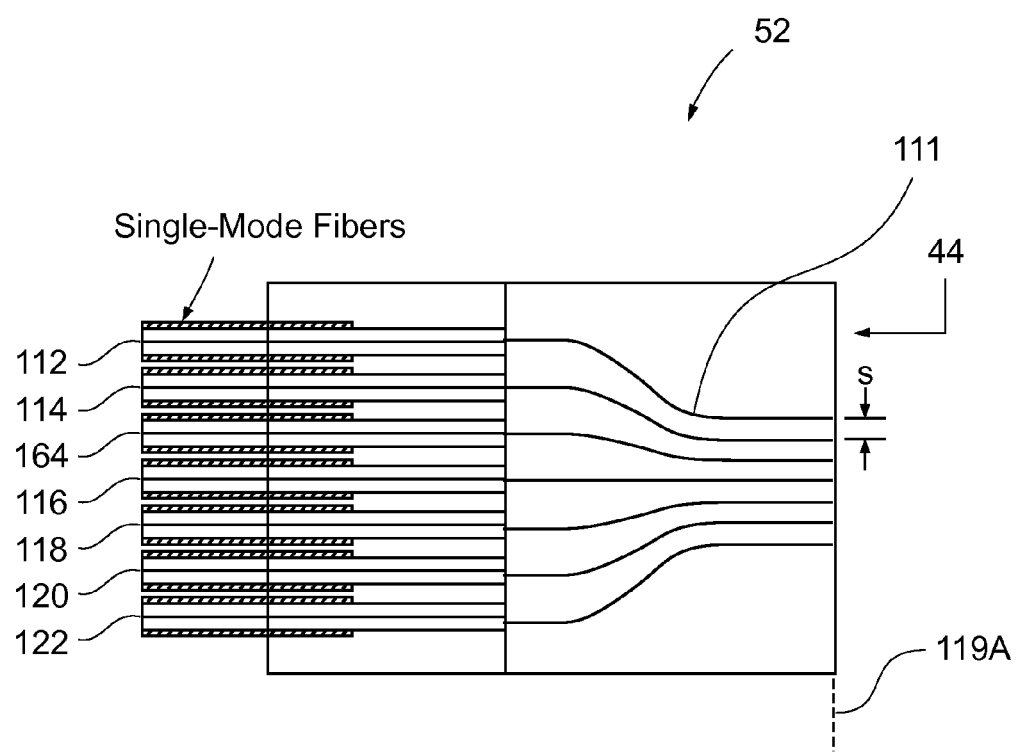
FIG. 3 is a schematically illustrated fiber concentrator array using waveguides included in the WSS of FIG. 1.

Referring now to FIG. 1, there is illustrated a six input fiber port by one output fiber port wavelength selective switch 10. However, it is emphasized that this 6×1 embodiment is illustrated only for simplicity, and that by changing the number of input fiber ports to N, then an N×1 switch 10 is contemplated herein, wherein N represents the number of input fiber ports. In the illustrated N×1, N=6 for optical selective switch 10 shown in FIG. 1, specifically six input fiber ports 12, 14, 16, 18, 20, 22, and one output fiber port 64 are optically coupled to a guiding member or fiber concentrator array (FCA) 52, (or fiber port array), shown in a linear alignment, wherein preferably all fibers are coupled to their respective waveguides 32, 34, 36, 38, 40, 42, and 46, used to bring the respective signals of fiber ports 12, 14, 16, 18, 20, 22 and 64 closer together on output face 44 of fiber concentrator array 52 adjacent the optics. Further, waveguides 32, 34, 36, 38, 40, 42, 46 are also preferably used to output the signals in parallel and in a predominantly linearly spaced grid, wherein waveguides 32, 34, 36, 38, 40, 42 have curved shapes (as shown in FIG. 3) within fiber concentrator 52 and are optically coupled to input fiber ports 12, 14, 16, 18, 20, 22. It is contemplated herein that a signal, also known as an optical signal, may comprise multi-wavelength WDM signals and such signals travel in free space (as beams), and via fiber, waveguides, and other signal carriers.

It should be recognized that waveguides could be made utilizing stripped portions of said fibers, planar waveguides, extruded waveguides, silicon dioxide waveguides, silicon nitride waveguides, silicon oxynitride waveguides, aluminosilicate waveguides, chalcogenide waveguides, photonic crystal waveguides, holey waveguides, plastic waveguides, glass waveguides or the like known by one of ordinary skill in the art are included herein.

Although other connecting arrangements are possible, preferred fiber concentrator 52 offers advantages over other connecting arrangements. For example, waveguides 32, 34, 36, 38, 40, 42 of preferred fiber concentrator 52 concentrate and reduce the spacing between input fiber ports 12, 14, 16, 18, 20, 22 from approximately 125 micrometers (representative of the fiber diameters) to the considerably reduced spacing of, for example, approximately 40 micrometers, which is more appropriate for the magnifying optics of switch 10. Each of waveguides 32, 34, 36, 38, 40, 42 is preferably coupled to the respective 12, 14, 16, 18, 20, 22 input fiber port. Waveguides 32, 34, 36, 38, 40, and 42 preferably extend along a predominately common plane, directing the multi-wavelength signals to output at a corresponding aperture into free-space and to propagate along central axes which are also co-planar.

The free-space beams output by waveguides 32, 34, 36, 38, 40, 42 of fiber concentrator 52 are preferably divergent and preferably have a curved field. For simplicity, this discussion will describe all the beams as if they are input beams, that is, output from fiber concentrator 52 to free-space optics (FSO) 74. The beams are in fact, optical fields coupled between optical elements. As a result, the very same principles as those discussed for input beams apply to those of the beams that are output beams, which eventually reenter fiber concentrator 52 for transmission onto the network.

The beams output from fiber concentrator 52 into the free space of wavelength selective switch 10 preferably pass through front end optics (FE) 56. Outputs of waveguides 32, 34, 36, 38, 40, 42 (apertures) of output face 44 preferably are directed to a position at or near the focal point of front end optics 56. Front end optics 56 preferably accepts the beams coming from or going to all fibers via input 12, 14, 16, 18, 20, 22 and output 64 fiber ports. For beams emerging from a fiber or input port, front end optics 56 preferably captures, focuses, conditions, projects and/or collimates the light in preparation for spectral dispersion by dispersive element 62. The reverse of this happens for beams converging toward a fiber; that is, the principles of operation are identical in both case, and independent of the direction of the light. It should be noted that common dispersive elements do not operate exactly as shown in FIG. 1, more specifically, the input and diffracted beams do not lie in the same plane as shown in FIG. 1.

Although a single lens is illustrated in FIG. 1, front end optics 56 may generally consist of two or more lenses and/or mirrors or a combination of the same, and may become progressively sophisticated as the demands of wavelength selective switch 10 increase (e.g., the number of fibers, the range of wavelengths, the number of input and output fiber ports, the spacing of the MEMS mirrors, etc.). For example, in a two lens front end optics 56, the first lens (closest to the fibers or input fiber ports) may be used to produce customary flat-field and telecentric beams that easily accommodate simple fiber arrays or fiber concentrator 52, and the second lens may perform the majority of the collimation task. As the demands of wavelength selective switch 10 increase, front end optics 56 may further employ advanced features, such as aspheric optical surfaces, achromatic designs, and the like. Unlike traditional approaches, wherein a separate lens must be critically aligned to every fiber, front end optics 56 described herein are preferably common to every fiber, thereby enabling a realization of significant savings in assembly time and cost relative to previously known switch systems.

The collimated beams exiting front end optics 56 propagate substantially within a common plane, and are incident upon dispersive element 62, a wavelength dispersive element, wherein dispersive element 62 preferably comprises grating lines extending perpendicular to the principal plane of wavelength selective switch 10. The beams may overlap when they strike dispersive element 62, wherein dispersive element 62 preferably separates the input port beams into corresponding sets of wavelength-separated beams, λ1 through λn (wavelengths) for each input port, where n is the number of wavelengths in each input port. Dispersive element 62 angularly separates the multi-wavelength input beams into wavelength-specific sub-beams propagating in different directions parallel to the principal optical plane, or alternatively serves to recombine single-wavelength sub-beams into a multi-wavelength beam. Dispersive element 62 is uniform in the fiber direction, wherein the preferred uniformity allows use of dispersive element 62 for beams to and from multiple input and output fibers.

The line density of dispersive element 62 should preferably be as high as possible to increase spectral dispersion, but not so high as to severely reduce diffraction efficiency. Two serially arranged gratings would double the spectral dispersion. However, a single grating with a line density of approximately 1000 lines/millimeter has provided satisfactory performance. Dispersive element 62 is preferably aligned so that the beam from front end optics 56 has an incident angle of preferably 54 degrees on grating 62, and the diffracted angle is about 63 degrees. The difference in these angles results in optical astigmatism, which may be compensated by placing a prism between front end optics 56 and dispersive element 62. In brief, the diffraction efficiency of a grating is generally dependent on the characteristics of the polarization of the light with respect to the groove direction on the grating, reaching upper and lower diffraction efficiency limits for linear polarizations that are parallel p-polarization and perpendicular s-polarization to the grooves.

In addition, polarization sensitivity of the grating may be mitigated by introducing a quarter-wave plate (not shown) after dispersive element 62, (between dispersive element 62 and backend optics 66) or elsewhere in switch 10, wherein the optical axis of the quarter-wave plate is oriented at forty-five degrees relative to the dispersive element, thereby limiting diffraction efficiency polarization states described previously. It is contemplated herein that such quarter-wave plate may be placed elsewhere in switch 10. Preferably, every wavelength-separated sub-beam passes twice through the quarter-wave plate so that its polarization state is effectively altered from input to output fiber port. That is, dispersive element 62 preferably twice diffracts any wavelength-specific sub-beam, which has twice passed through the quarter-wave plate. For example, considering the two limiting polarization cases, the sub-beam passes once with a first limiting polarization (for example, p-polarization) and once again with a polarization state that is complementary to the first polarization state (for example, s-polarization) from the perspective of dispersive element 62. As a result, any polarization dependence introduced by dispersive element 62 is canceled. That is, the net efficiency of dispersive element 62 will be the product of its S-state and P-state polarization efficiencies, and hence independent of the actual polarization state of the input light.

In the wavelength division multiplexing (WDM) embodiments of the invention, each input fiber port 12, 14, 16, 18, 20, 22 is capable of carrying a multi-wavelength WDM optical signal having wavelengths λ1 through λn. Wavelength selective switch 10 is capable of switching the separate wavelength components from any input port to waveguide 46 of fiber concentrator 52, which is preferably coupled to output fiber port 64. This architecture applies as well to a WDM reconfigurable add/drop multiplexer (ROADM), such as a 6×1 ROADM in which fiber ports 12, 14, 16, 18, 20, 22 are associated respectively with the input (IN) (fiber port 12), five (5) add ports (ADD) (fiber ports 14, 16, 18, 20, 22), and output (OUT) (fiber port 64). In operation, individual wavelengths on fiber ports 14, 16, 18, 20, 22, (local ports) are switched by wavelength selective switch 10, and are either added (ADD) to the aggregate output (OUT) port 64 or blocked.

Back end optics (BE) 66 projects the wavelength-separated beams onto beam steering element (BSE) 68. Back end optics 66 creates the "light bridge" between dispersive element 62 and beam steering element 68 to switching mirror array 72. Considering the case of light diffracting from dispersive element 62 and traveling toward back end optics 66, such back end optics 66 captures the angularly (versus wavelength) separated beams of light, which is made plural by the number of fibers, and wherein back end optics 66 create parallel beams of light. The parallel beams are obtained via a preferred telecentric functionality of back end optics 66. In addition, because all beams are preferably at focus simultaneously on the flat MEMS plane of switching mirror array 72; back end optics 66 preferably performs with a field-flattening functionality. After light reflects off of a MEMS mirror and back into back end optics 66, the reverse of the above occurs; the principles of operation are identical in either case and are independent of the direction of the light. Back end optics 66 captures, focuses, conditions, projects and/or collimates the light in preparation for switching by switching mirror array 72. The reverse of this happens for light beams converging toward a fiber; that is, the principles of operation are identical in both case, and independent of the direction of the light.

Although a single lens is illustrated in FIG. 1, back end optics 66 may generally consist of two or more lenses and/or mirrors or combinations of the same, and may become progressively sophisticated as the demands of wavelength selective switch 10 increases (e.g., the number of fibers, the range of wavelengths, the number of input and output fiber ports, the spacing of the MEMS mirrors, etc.). The focal length of back end optics 66 (or the effective focal length in the case of multiple lenses) is determined from the rate of angular dispersion versus wavelength of dispersive element 62 and the desired mirror spacing of switching mirror array 72. If the angular separation between two neighboring wavelengths is denoted by A and the spacing between their associated MEMS micro-mirrors is denoted by S, then the focal length of back end optics 66 (F) is approximated by $F=S/\tan(A)$. Because the angular dispersion of common gratings is relatively small, and/or as the spectral separation between neighboring wavelengths is decreased, then back end optics 66 focal length may become relatively large. Preferably, however, a physically compact optical system may be achieved by providing back end optics 66 with a telephoto functionality, thereby reducing the physical length requirements of back end optics 66 by a factor of two or more. A three-lens system is generally sufficient to provide all of the functionalities described above, and the lenses themselves can become increasingly sophisticated to include aspheric surfaces, achromatic design, etc., as the demands of wavelength selective switch 10 increase (e.g., depending on the number of fibers, the range of wavelengths, the number of input and output fiber ports, the spacing of the MEMS mirrors, etc.). The focal length calculations set forth here with respect to the back end optics 66 are applicable to the front end optics 56 as well.

Such a preferred multi-lens back end optics 66 system, by virtue of its increased degrees-of-freedom, additionally allows for active optical adjustments to correct for various lens manufacturing tolerances and optical assembly tolerances that otherwise would not be available. Beam steering element 68, although physically existing in the beam path of back end optics 66, is preferably designed utilizing a passive monolithic element containing multiple prisms or lenses, as well as stacked lenses, reflective segmented prism elements and the like or combinations of the same, and preferably functions almost independently of back end optics 66.

Beam steering element 68 preferably refracts wavelength-separated beams from back end optics 66 and steers such beams onto switching mirror array 72 based on the refractive indices of each segment, whether focusing all λn beams on a λn mirror of switching mirror array 72 or focusing some λn beams onto one mirror and other λn beams on another mirror or a mirror in a different row. Beam steering element 68 (or segmented prism element, one possible type of steering element) refracts λn from each input port 12, 14, 16, 18, 20, 22 onto λn mirror of switching mirror array 72 assigned to λn. For example, preferably λ1 mirror of switching mirror array 72 has λ1(12)-λ1(22) from all input fiber ports 12-22 projected onto λ1 mirror surface via beam steering element 68, and by moving, rotating or tilting λ1 mirror of MEMS switching mirror array 72, wavelength selective switch 10 preferably switches one selected λ1 (12-22) from input fiber ports 12-22 to output fiber port 64 and blocks the remaining unselected λ1(s) from input fiber ports 12-22, and so forth for λ2-λn. Each λn mirror of switching mirror array 72, in this example, preferably has five input beams projected simultaneously onto the surface of such mirror, all at wavelength λn, wherein those five beams are preferably demultiplexed and focused by free space optics 74 from input fiber ports 12, 14, 16, 18, 20 respectively. It should be recognized that utilizing beam steering element 68 enables refracting and/or steering of multiple wavelengths onto a single mirror from one or more input fiber ports 12-22, or refracting light to any arbitrary point, wherein prior art switches use lenses or mirrors to focus only individual wavelengths to individual dedicated mirrors based on one focal point. Further, it should be recognized that utilizing beam steering element 68 further enables the potential elimination of lenslets for each optical fiber port, thereby reducing the number of elements and the overall cost of the switch.

Referring again to FIG. 1, the distance between switching mirror array 72, beam steering element 68, and the vertical location of the beam at beam steering element 68, and free space optics 74 as well as other factors including fiber spacing, number of input fiber ports, number of wavelength components per input port, lenses, grating, MEMS mirror configuration and output fiber ports preferably determines the facet angle required to enable all six input port wavelengths to be positioned on each MEMS mirror assigned to the specific wavelength of switching mirror array 72. Because the vertical locations of the various fiber port components are different as they intercept the beam steering element 68, the facet angles of beam steering element 68 preferably vary accordingly in order to combine all of wavelengths λn at a common mirror λn of switching mirror array 72. The analogous situation exists for the selected input port wavelength λn reflecting from mirror λn of switching mirror array 72 directed to output fiber port 64.

Still referring to FIG. 1, there are many ways of configuring the MEMS array of micromirrors and their actuation as wavelength switching array (WSA) 75. The following is an example: The MEMS array may be bonded to and have an array of solder bumps contacting it to control circuitry 78, including high-voltage circuitry needed to drive the electrostatic actuators associated with each of the mirrors. Control circuitry (controller) 78 controls the driver circuit and hence the mirrors in a multiplexed control system including address lines, data lines, and a clock line, driven in correspondence to an oscillator. The control is preferably performed according to pulse width modulation (PWM), a method for controlling the mirror tilt, as Garverick has described in U.S. Pat. No. 6,543,286, issued Apr. 8, 2003, and U.S. Pat. No. 6,705,165, issued Mar. 16, 2004, incorporated herein by reference in their entirety. In these methods, a high-voltage square-wave common node drive signal is supplied through one or more power transistors to the common electrical node comprising all the mirrors while the driver array delivers phase delayed versions of the square-wave signal to each individual electrode, the amount of delay determining the RMS voltage applied across the electrostatic actuator electrodes of each mirror. In addition, Garverick has described in U.S. Pat. No. 6,788,981, issued Sep. 7, 2004 and incorporated herein by reference in its entirety, a method wherein an analog control system for an array of moveable mechanical elements, such as moveable mirrors, formed in a micro electromechanical system (MEMS) is disclosed.

Although moveable micromirrors are particularly advantageous for the presently described system and method, there are other types of MEMS mirrors that can be electrostatically, electrically, magnetically, thermally, or otherwise actuated to different positions or orientations to affect the beam switching of the invention.

Control circuitry 78 preferably receives switch commands from the external system to effect switching of the wavelength separated channels between the input and output fibers. Preferably, the drive voltage pulse widths that correspond to mirror angles needed for switching, which is primarily representative of the physical characteristics of the MEMS array and its driver circuit, may be stored in an electrically programmable read-only memory of control circuitry 78.

In an alternate switch 10, a white-light cross connect switch that switches all λs on a given fiber together can be adapted from the system of FIG. 1 by eliminating dispersive element 62. Although the invention has been described with respect to a wavelength selective switch, many of the inventive optics can be applied to white-light optical cross connects that do not include a wavelength dispersive element 62 or beam steering element 68. For example, a mirror of switching mirror array 72 receives the optical signal from input fiber port 12 and another mirror of switching mirror array 72 receives the optical signal from input fiber port 14 and so on, and by moving, rotating or tilting the mirror of switching mirror array 72, thus, connecting input fiber port 12 to output fiber port 64 and blocking the remaining unselected input fiber ports 14, 16, 18, 20, 22 from connecting to output fiber port 64; thus, alternate switch 10 forms a white-light cross connect switch.

Figure 2:
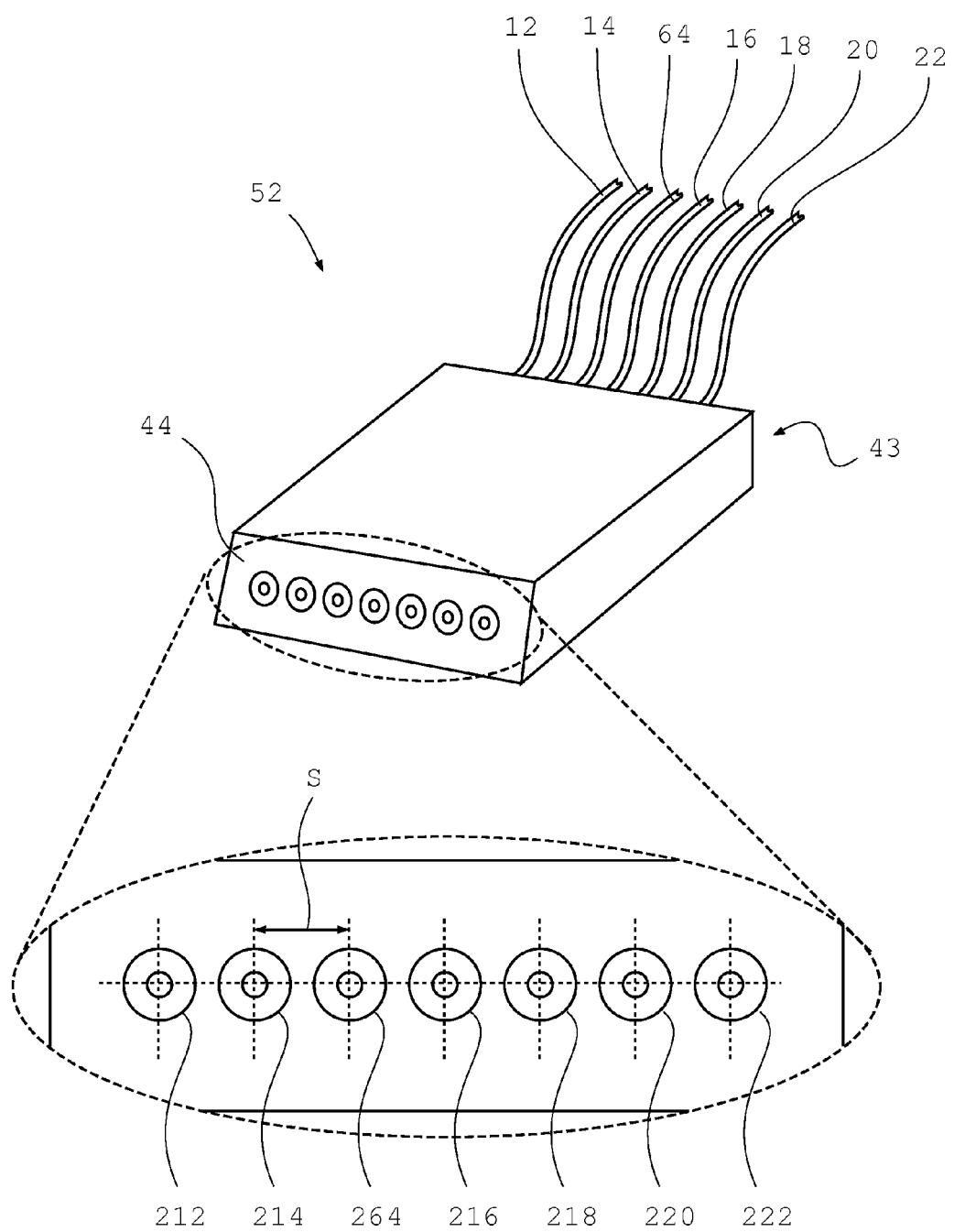
FIG. 2 is a schematically illustrated fiber concentrator array with coupled input and output optical fibers.

Referring now to FIG. 2, there is illustrated a schematic illustration of a fiber concentrator array with coupled input and output optical fibers. Preferably, fiber concentrator 52 comprises input fiber ports 12, 14, 16, 18, 20, 22 and output fiber port 64, which are coupled to input face 43 of fiber concentrator 52. On the opposite or other side of fiber concentrator 52 is output face 44, which comprises a termination point defining an interface with free-space (apertures 212, 214, 216, 218, 220, 222 and 264), wherein input optical signals propagating within an optical fiber and/or a waveguide within the fiber concentrator 52 may exit the fiber and/or waveguide, and propagate through free-space, and wherein output face 44 receives an optical output signal from said free-space.

Referring now to FIG. 3, there is illustrated a fiber concentrator array utilizing waveguides. Fiber concentrator 52 preferably comprises waveguides 111 adapted to receive and secure optical fibers 112, 114, 116, 118, 120, 122 and output fiber port 164 in a selected position and/or orientation. In the optical switch 10 illustrated in FIG. 1, each of optical fibers 112-122 and 164 is substantially aligned, defining a switching plane, and comprising a one-dimensional array. In FIG. 3, each of optical fibers 112-122 and 164 preferably comprises a termination point of the fiber, converting to a waveguide 111 carrier and concluding as an interface with free-space represented by line 119A, wherein optical signals propagating within the optical fibers and waveguides 111 may exit the fiber and waveguide 111, and propagate through free-space. Optical fibers 112-122 and 164 preferably terminate at the edge of the fiber array, represented by line 119A, and radiate light containing WDM signals into free-space, wherein the light is then captured and manipulated by the various lenses and components of optical switch 10. Similarly, optical signals propagating in free-space that encounter the termination point represented by line 119A, at least within a certain range of angular displacements, may enter into, and propagate within waveguide 111 and optical fiber 164. Each such termination point is preferably aligned along line 119A, wherein line 119A preferably is disposed at a location where the optical signal exhibits a Gaussian beam waist, for the purpose of, but not limited to, enabling a reduced core-to-core spacing represented by S and reduced mirror tilt angles required of switching element 72, for switching between fiber ports spaced a given distance apart. It is contemplated herein that, with regard to fiber concentrator 52, the word "fibers" is synonymous with "waveguides" since the fibers that comprise the optical ports of the system may be coupled (i.e., transitioned) to waveguides 111 within fiber concentrator 52.

In the preferred embodiment, the transition from fibers 112-122 to waveguide 111 comprises stripping the fiber jacket and all or most of its buffer, resulting in an un-jacketed, un-buffered optical core segment leaving only the core and cladding, which transforms fibers 112-122 into waveguide 111 or a portion of waveguide 111 and thereafter waveguide 111 rests in an etched groove or fiber support surface in the substrate as disclosed in U.S. Pat. No. 7,149,399 to Meder et al. entitled Glass Bonded Fiber Array and Method for the Fabrication Thereof, which is incorporated herein by reference in its entirety. In an alternate embodiment, waveguide 111 is a waveguide grown or deposited in the silicon or glass substrate, made for example of silicon dioxide; however, it is contemplated that other fabrication materials known by one of ordinary skill in the art are included herein. In this alternate embodiment, fibers 112-122 actually terminate at the interface to planar waveguide 111. This type of connection is usually facilitated with an index matching gel.

As it may benefit switch 10, this fiber-to-waveguide transition preferably facilitates the reduction of the core-to-core spacing of waveguides 111 at the edge of the array represented by line 119A, to output the beams in parallel in a linearly spaced grid, and further to aid in the implementation of a large number of fibers in fiber concentrator 52. In FIG. 3, the preferred core-to-core spacing has been reduced to a value represented by S at the free-space edge, represented by line 119A of fiber concentrator 52. The light emitting from a fiber or waveguide in fiber concentrator 52 diverges immediately at the free-space edge along line 119A of the array; hence, there is a beam waist for each fiber at this edge. Among other favorable attributes, the preferred concentrated fiber core spacing reduces the amount of "dead space" between fibers which would otherwise increase the total mirror tilt range in switching element 72. Preferably, the fiber-to-fiber spacing in fiber concentrator 52 can be condensed to approximately 30 microns or less. This leads to a very compact optical system for optical switch 10 and to relatively small tilt angles for a high optical fibers port-count optical switch 10. The type of fiber concentrator 52 needed for operation of optical switch 10 is commonly available from a number of commercial sources.

However, switch 10 is not limited to fiber concentrator arrays, fiber arrays or bundled fiber but has a broader application to any fiber device that benefits from precise positioning of apertures, waveguides, optical fibers, optical transitions and/or fiber stubs for reduced static back reflection and static in-to-in crosstalk in switch 10.

Referring again to the schematic of FIG. 1, it can be seen that fiber concentrator array 52 is arranged such that waveguide 46, which corresponds to the single output fiber port 64, is preferably positioned at or near the center of the linear array of apertures on output face 44. As can be seen conceptually in the schematic, this arrangement allows for a more symmetrical tilt requirement on each tiltable mirror in switching array 72. That is, when output waveguide 46 is closer to the middle of the aperture array on output face 44, mirror 260's maximum required tilt angle away from the 'neutral' position perpendicular to the baseplate, is preferably approximately equal in both tilt directions (toward the baseplate and away from the baseplate). Equal or near equal tilt in both directions is generally advantageous and simplifies design and fabrication of electrostatic MEMS micromirrors of the type shown in FIG. 6. Depending on specific design requirements, second order constraints may dictate locating the output waveguide 46 aperture away from aperture array on output face 44 center; however in the preferred embodiment it is located generally near or at the center. The examples shown in FIGS. 1 through 5, 7, and 8 assume preferred embodiments where output waveguide 46 is near, or directly at, the center of aperture array on output face 44.

Referring now to FIGS. 4A-4F, there is illustrated an optical switch diagram of the origin of static back reflection, crosstalk and other stray light found in an equally spaced fiber port fiber concentrator array or optical fiber bundle. For example, in FIG. 4A there is illustrated a switching configuration resulting in unwanted back reflection. When mirror 472 of 6×1 optical switch 410 is configured to couple an input optical signal from input fiber port 1 412 to output fiber port 3 464, unwanted back reflection occurs in input fiber port 2 414 while mirror 472 is in its static state holding the switch position between input fiber port 1 412 and output fiber port 3 464. Specifically, the optical signal from input fiber port 2 414 unintentionally travels in free space to mirror 472 (in 1-3 fiber port position), reflects off mirror 472, travels in free-space back to input fiber port 2 414, and resulting in a back reflection of the optical signal from input fiber port 2 414 back on itself. This back reflection comes about because fiber ports 1 414, 2 412 and 3 464 are equally spaced on fiber concentrator array output face 44. The angle between port 1 412 and port 2 414 and the angle between port 2 414 and port 3 464 are symmetric about axis of symmetry 999, which lies along the optical signal beam path from port 2 414. The desired optical signal route for the 1-3 fiber port position includes coupled fiber ports 1-3. The unwanted signal route is 2-2.

Figure 4A:
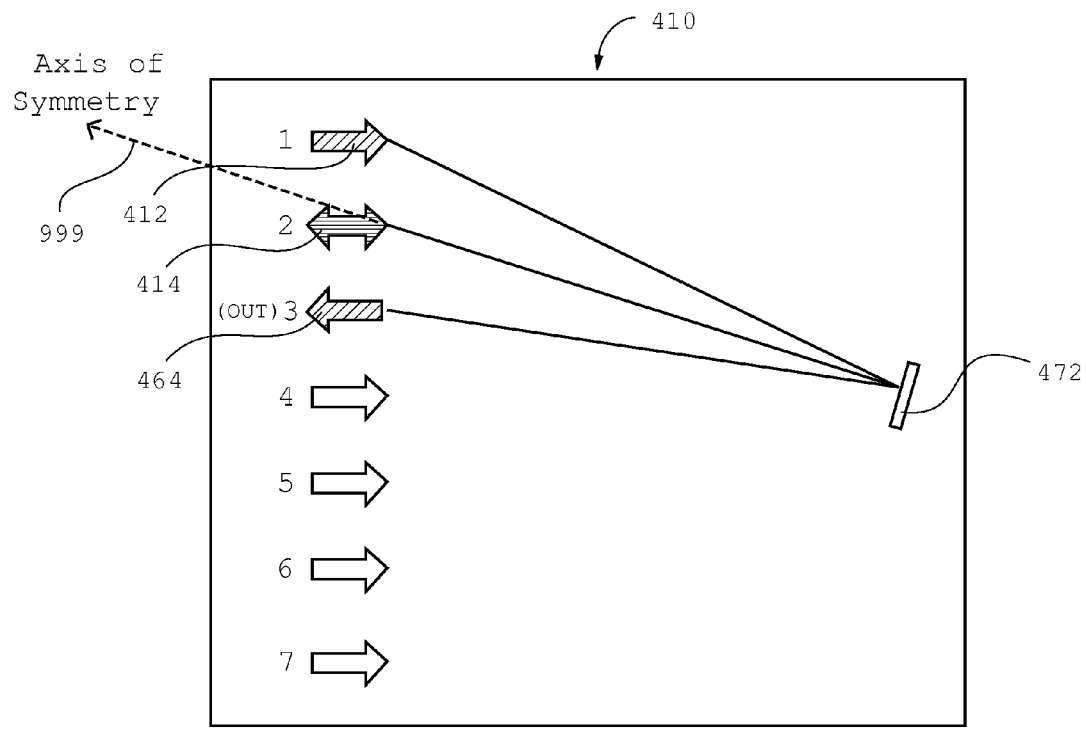
FIGS. 4A-4F are diagrams illustrating the origin of static return loss and static in-to-in crosstalk of an equally spaced fiber port fiber concentrator array.
Figure 4B:
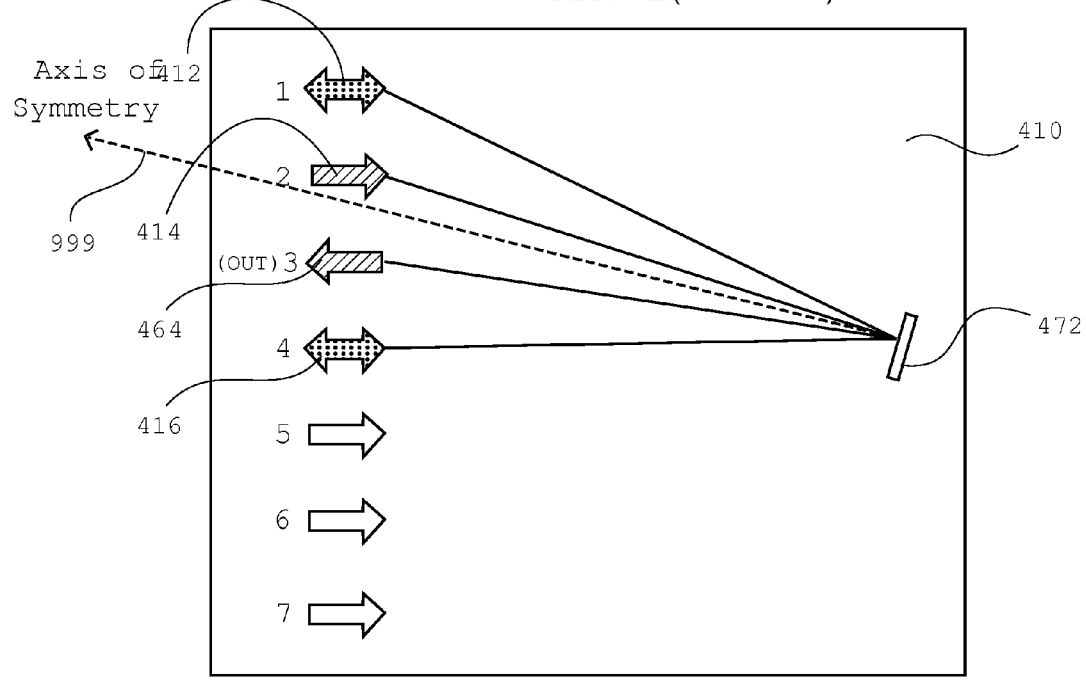

As a further example, in FIG. 4B there is illustrated a switching configuration resulting in unwanted in-to-in crosstalk. When mirror 472 of 6×1 optical switch 410 is configured to couple an input optical signal from input fiber port 2 414 to output fiber port 3 464, unwanted in-to-in crosstalk occurs between input fiber port 1 412 and input fiber port 4 416 while mirror 472 is in its static state holding the switch position between input fiber port 2 414 and output fiber port 3 464. Specifically, the optical signal from input fiber port 1 412 unintentionally travels in free space to mirror 472 (in the 2-3 fiber port position), reflects off mirror 472, and travels in free-space back to input fiber port 4 416, resulting in in-to-in crosstalk from input fiber port 1 412 to input fiber port 4 416. Likewise, the optical signal from input fiber port 4 416 unintentionally travels in free space to mirror 472 (in the 2-3 fiber port position), reflects off mirror 472, and travels in free-space back to input fiber port 1 412, resulting in in-to-in crosstalk from input fiber port 4 416 to input fiber port 1 412. In this case, the equal spacing of the fiber ports on fiber concentrator array output face 44 causes in-to-in crosstalk because all coupling angles—desired and unwanted—are symmetric about the same axis 999. The unwanted angle of reflection (between ports 1 412 and 4 416) is an integer multiple of the desired angle of reflection (between ports 2 414 and 3 464). Desired optical signal routes for the 2-3 fiber port position include coupled fiber ports 2-3. Unwanted signal routes include coupled fiber ports 1-4 and 4-1.

Figure 4C:
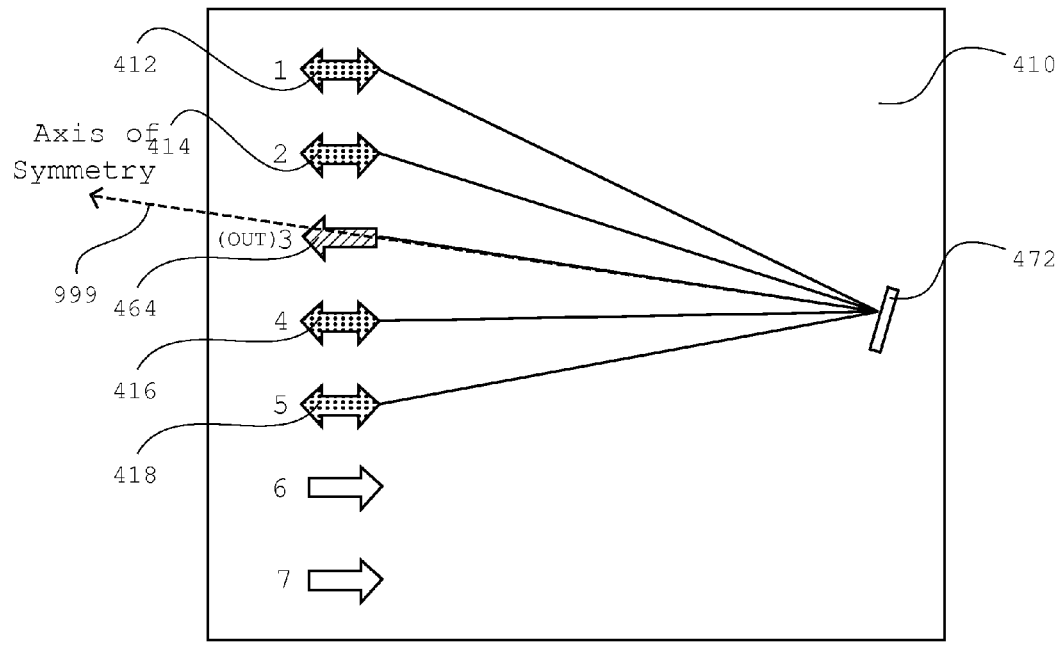

Still a further example, in FIG. 4C there is illustrated a switching configuration resulting in unwanted in-to-in crosstalk. When mirror 472 of 6×1 optical switch 410 is positioned in its intended non-switching state (block) state, unwanted in-to-in crosstalk occurs between input fiber port 1 412 and input fiber port 5 418 and between input fiber port 2 414 and input fiber port 4 416. Specifically, the optical signal from input fiber port 1 412 unintentionally travels in free space to mirror 472 (in the block position), reflects off mirror 472, and travels in free-space back to input fiber port 5 418, resulting in in-to-in crosstalk from input fiber port 1 412 to input fiber port 5 418. Likewise, the optical signal from input fiber port 5 418 unintentionally travels in free space to mirror 472 (in the block position), reflects off mirror 472, and travels in free-space back to input fiber port 1 412, resulting in in-to-in crosstalk from input fiber port 5 418 to input fiber port 1 412. Moreover, the optical signal from input fiber port 2 414 unintentionally travels in free space to mirror 472 (in the block position), reflects off mirror 472, and travels in free-space back to input fiber port 4 416, resulting in in-to-in crosstalk from input fiber port 2 414 to input fiber port 4 416. Likewise, the optical signal from input fiber port 4 416 unintentionally travels in free space to mirror 472 (in the neutral switch position), reflects off mirror 472, and travels in free-space back to input fiber port 2 414, resulting in in-to-in crosstalk from input fiber port 4 416 to input fiber port 2 414. Here the equal spacing of the fiber ports on fiber concentrator array output face 44 causes in-to-in crosstalk because all coupling angles—desired and unwanted—are symmetric about the same axis 999, which in this case is also the beam path to output port 3 464. Since the axis of symmetry 999 is substantially perpendicular to the mirror surface, the incident angle from one port equals the reflected angle to the unintended other port. Desired optical signal routes for the block position include coupled fiber ports 3-3. Unwanted optical signal routes include coupled fiber ports 1-5, 2-4, 4-2, and 5-1.

It is noted that the above-described block state is one possible reason for intentionally tilting mirror 472 such that its surface is substantially perpendicular to the beam path of output fiber port 3 464. Another use for this tilt angle is to create an extra input port, by placing an external optical circulator on port 3 464 and making it bidirectional. In this case the intended optical signal route includes coupled fiber ports 3-3.

Figure 4D:
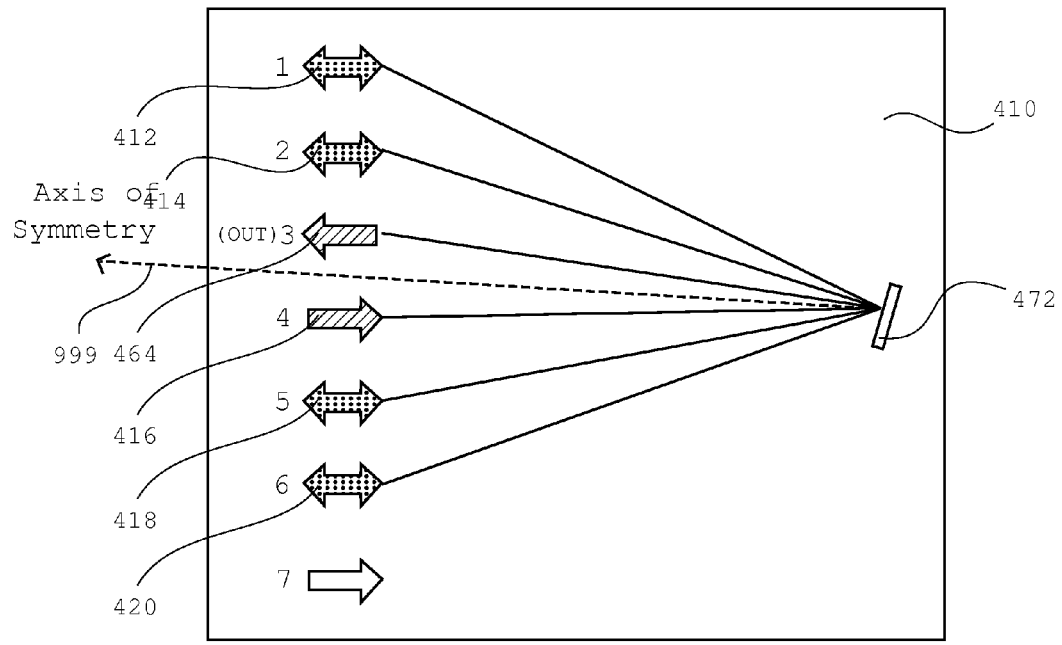

As yet another example, in FIG. 4D there is illustrated a switching configuration resulting in unwanted in-to-in crosstalk. When mirror 472 of 6×1 optical switch 410 is configured to couple an input optical signal from input fiber port 4 416 to output 3 464, unwanted in-to-in crosstalk occurs between input fiber port 1 412 and input fiber port 6 420 while mirror 472 is in its static state holding the switch position between input fiber port 4 416 and output fiber port 3 464. Specifically, the optical signal from input fiber port 1 412 unintentionally travels in free space to mirror 472 (in the 4-3 fiber port position), reflects off mirror 472, and travels in free-space back to input fiber port 6 420, resulting in in-to-in crosstalk between from fiber port 1 412 to input fiber port 6 420. Likewise, the optical signal from input fiber port 6 420 unintentionally travels in free space to mirror 472 (in the 4-3 fiber port position), reflects off mirror 472, and travels in free-space back to input fiber port 1 412, resulting in in-to-in crosstalk from input fiber port 6 420 to input fiber port 1 412. Moreover, the optical signal from input fiber port 2 414 unintentionally travels in free space to mirror 472 (in the 4-3 fiber port position), reflects off mirror 472, and travels in free-space back to input fiber port 5 418, resulting in in-to-in crosstalk from input fiber port 2 414 to input fiber port 5 418. Likewise, the optical signal from input fiber port 5 418 unintentionally travels in free space to mirror 472 (in the 4-3 fiber port position), reflects off mirror 472, and travels in free-space back to input fiber port 2 414, resulting in in-to-in crosstalk from input fiber port 5 418 to input fiber port 2 414. The equal spacing of the fiber ports on fiber concentrator array output face 44 causes in-to-in crosstalk because all coupling angles—desired and unwanted—are symmetric about the same axis 999, which in this case substantially bisects the angle between desired input port 4 416 and output port 3 464. Since the axis of symmetry 999 is substantially perpendicular to the mirror surface, the incident angle from one port equals the reflected angle to a symmetrical other port. Desired optical signal routes for this switch position include coupled fiber ports 4-3. Unwanted optical signal routes include coupled fiber ports 2-5, 5-2, 1-6, and 6-1.

Figure 4E:
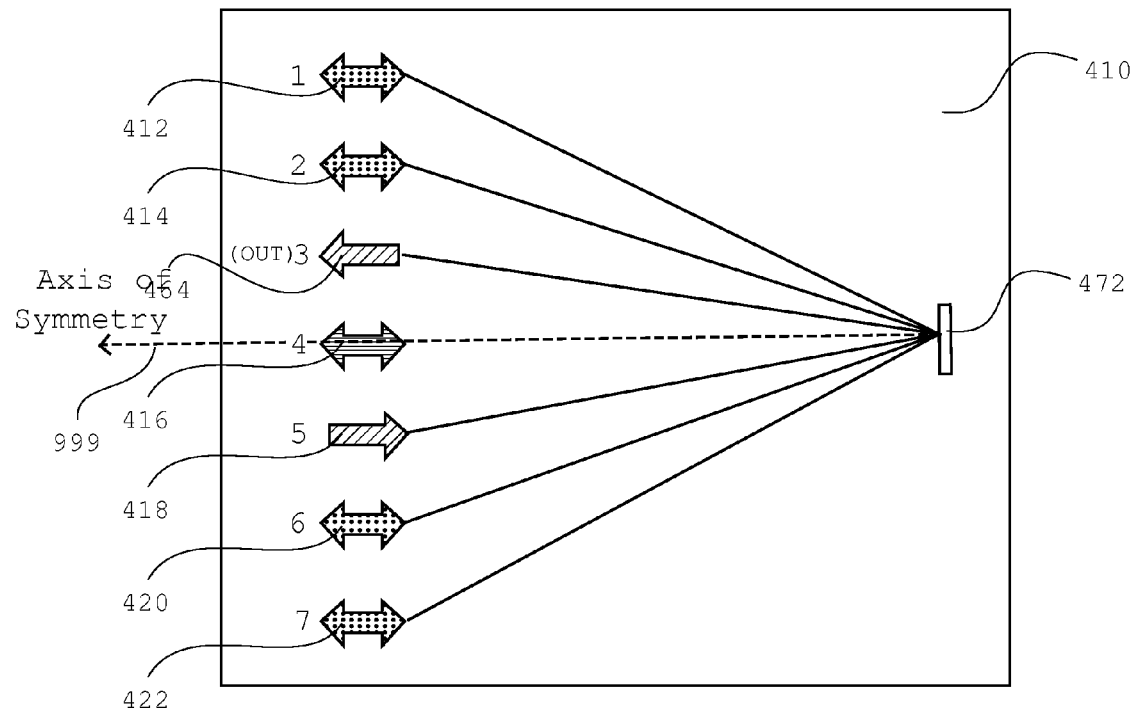

As yet another example, in FIG. 4E there is illustrated a switching configuration resulting in unwanted in-to-in crosstalk and back reflection. When mirror 472 of 6×1 optical switch 410 is configured to couple an input optical signal from input fiber port 5 418 to output 3 464, unwanted in-to-in crosstalk occurs between input fiber port 2 414 and input fiber port 6 420 while mirror 472 is in its static state holding the switch position between input fiber port 5 418 and output fiber port 3 464. Specifically, the optical signal from input fiber port 2 414 unintentionally travels in free space to mirror 472 (in the 5-3 fiber port position), reflects off mirror 472, and travels in free-space back to input fiber port 6 420, resulting in in-to-in crosstalk from input fiber port 2 414 to input fiber port 6 420. Likewise, the optical signal from input fiber port 6 420 unintentionally travels in free space to mirror 472 (in the 5-3 fiber port position), reflects off mirror 472, and travels in free-space back to input fiber port 2 414, resulting in in-to-in crosstalk from input fiber port 6 420 to input fiber port 2 414. Additionally, unwanted in-to-in crosstalk occurs between input fiber port 1 412 and input fiber port 7 422 while mirror 472 is in its static state holding the switch position between input fiber port 5 418 and output fiber port 3 464. Specifically, the optical signal from input fiber port 1 412 unintentionally travels in free space to mirror 472 (in the 5-3 fiber port position), reflects off mirror 472, and travels in free-space back to input fiber port 7 422, resulting in in-to-in crosstalk from input fiber port 1 412 to input fiber port 7 422. Likewise, the optical signal from input fiber port 7 422 unintentionally travels in free space to mirror 472 (in the 5-3 fiber port position), reflects off mirror 472, and travels in free-space back to input fiber port 1 412, resulting in in-to-in crosstalk from input fiber port 7 422 to input fiber port 1 412. Moreover, when mirror 472 of 6×1 optical switch 410 is configured to couple an input optical signal from input fiber port 5 418 to output 3 464, unwanted back reflection occurs input fiber port 4 416 while mirror 472 is in its static state holding the switch position between input fiber port 5 418 and output fiber port 3 464. Specifically, the optical signal from input fiber port 4 416 unintentionally travels in free space to mirror 472 (in 5-3 fiber port position), reflects off mirror 472, and travels in free-space back to input fiber port 4 416, resulting in a back reflection of the optical signal from input fiber port 4 416 back on itself.

The equal spacing of the fiber ports on fiber concentrator array output face 44 causes in-to-in crosstalk because all coupling angles—desired and unwanted—are symmetric about the same axis 999, which in this case lies along the optical signal beam path from input port 4 416. Since the axis of symmetry 999 is substantially perpendicular to the mirror surface, the incident angle from one port equals the reflected angle to a symmetrical other port. Desired optical signal routes for this switch position include coupled fiber ports 5-3. Unwanted optical signal routes include coupled fiber ports 1-7, 2-6, 4-4, 6-2 and 7-1.

Figure 4F:
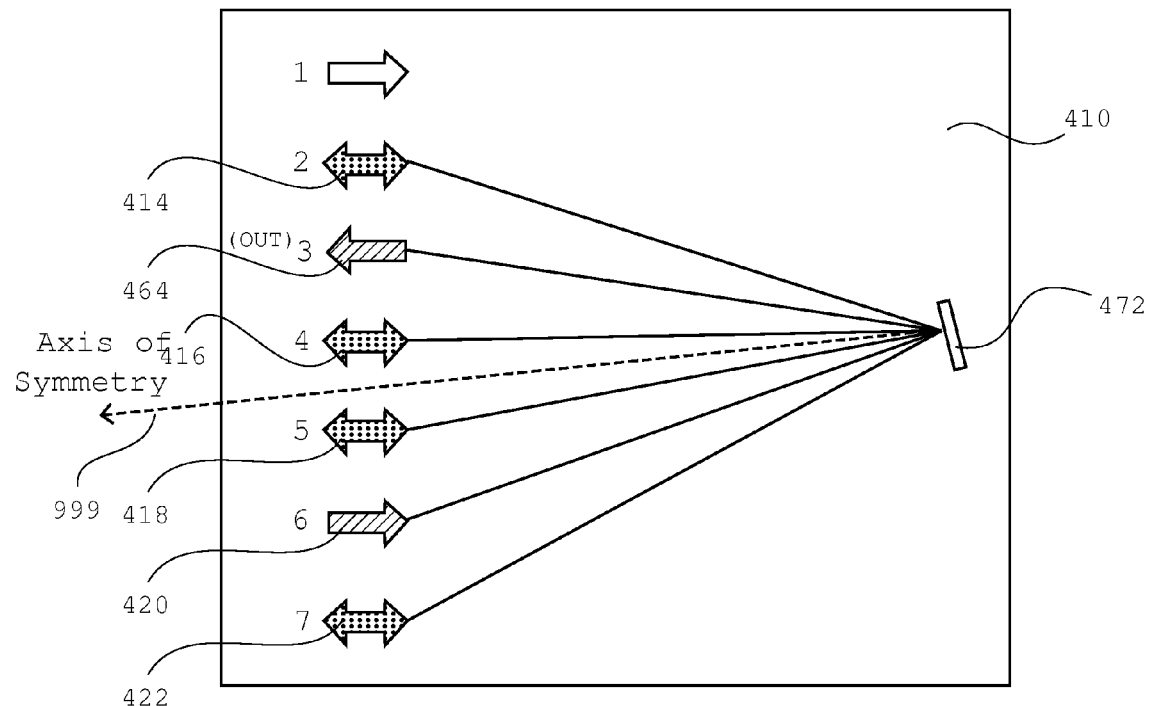

As yet another example, in FIG. 4F there is illustrated a switching configuration resulting in unwanted in-to-in crosstalk. When mirror 472 of 6×1 optical switch 410 is configured to couple an input optical signal from input fiber port 6 420 to output 3 464, unwanted in-to-in crosstalk occurs between input fiber port 4 416 and input fiber port 5 418, as well as between input fiber port 7 422 and input fiber port 2 414. Specifically, the optical signal from input fiber port 4 416 unintentionally travels in free space to mirror 472 (in the 6-3 fiber port position), reflects off mirror 472, and travels in free-space back to input fiber port 5 416, resulting in in-to-in crosstalk from input fiber port 4 416 to input fiber port 5 418. Likewise, the optical signal from input fiber port 5 418 unintentionally travels in free space to mirror 472 (in the 6-3 fiber port position), reflects off mirror 472, and travels in free-space back to input fiber port 4 416, resulting in in-to-in crosstalk from input fiber port 5 418 to input fiber port 4 416. Specifically, the optical signal from input fiber port 2 414 unintentionally travels in free space to mirror 472 (in the 6-3 fiber port position), reflects off mirror 472, and travels in free-space back to input fiber port 7 422, resulting in in-to-in crosstalk from input fiber port 2 414 to input fiber port 7 422. Likewise, the optical signal from input fiber port 7 422 unintentionally travels in free space to mirror 472 (in the 6-3 fiber port position), reflects off mirror 472, and travels in free-space back to input fiber port 2 414, resulting in in-to-in crosstalk from input fiber port 7 422 to input fiber port 2 414.

The equal spacing of the fiber ports on fiber concentrator array output face 44 causes in-to-in crosstalk because all coupling angles—desired and unwanted—are symmetric about the same axis 999, which in this case substantially bisects the angle between optical signal beam path from desired input port 6 420 and desired output port 3 464. Since the axis of symmetry 999 is substantially perpendicular to the mirror surface, the incident angle from one port equals the reflected angle to a symmetrical other port. Desired optical signal routes for this switch position include coupled fiber ports 6-3. Unwanted optical signal routes include coupled fiber ports 2-7, 4-5, 5-4, and 7-2.

Furthermore, it should be recognized in the above examples that while optical switch 410 is configured to couple an input optical signal from an input fiber port to an output fiber port, or when such switch is in the block position, radiation from unselected fiber ports is being coupled between unintentional fiber ports or waveguides, producing static back reflection, crosstalk and other stray light while switch 410 maintains such switching or coupling position. The examples given in FIGS. 4A-4F are representative of many possible crosstalk and back reflection cases in the prior art, caused by symmetry of desired and unwanted coupling about a common axis. Many other examples will be obvious to one skilled in the art.

Figure 5A:
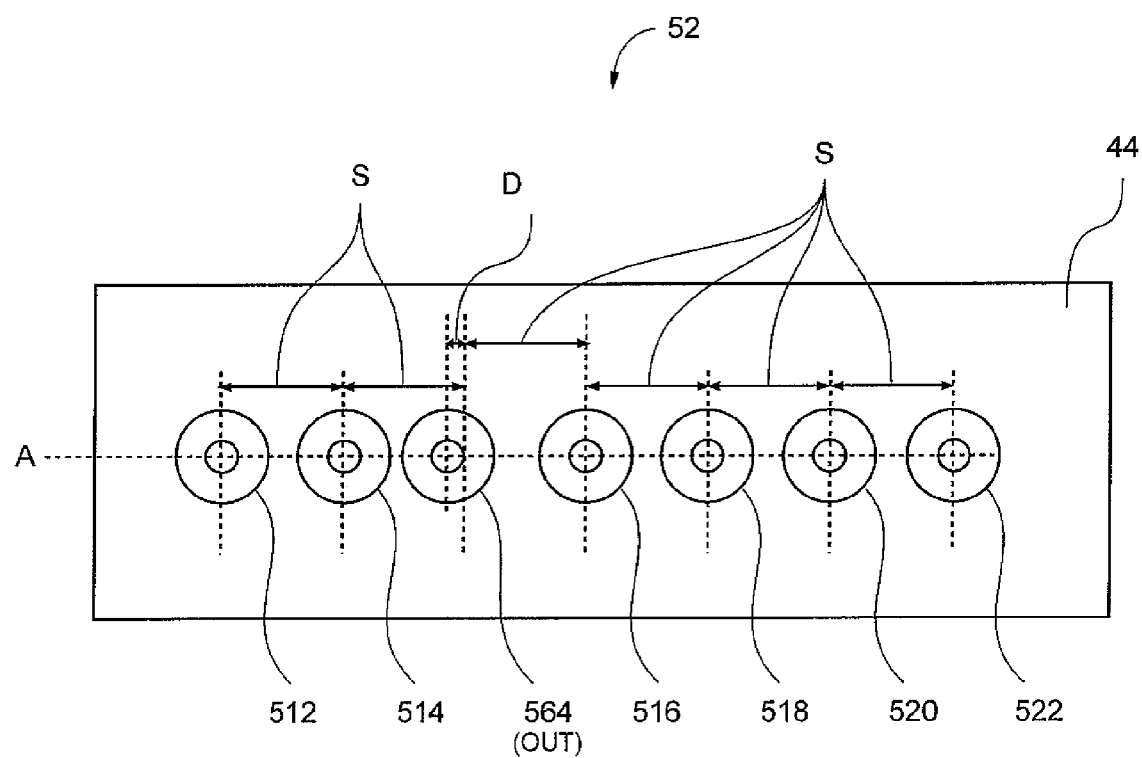
FIGS. 5A-5C are schematically illustrated faces of a fiber concentrator array according to a preferred embodiment.

Referring now to FIG. 5A, by way of example, and not limitation, there is illustrated an asymmetrical fiber concentrator array (FCA) 52 shown from a front view of output face 44, in accordance with a preferred embodiment of the present system and method. Preferably, fiber array 52 comprises a termination point along output face 44 defining an interface with free-space, wherein input optical signals propagating within an optical fiber and/or a waveguide within the fiber concentrator 52 may exit the fiber and/or waveguide, and propagate through free-space, and wherein output face 44 receives an optical output signal from free-space based on a switching position established by optical switch 10. Input fiber port apertures 512, 514, 516, 518, 520, 522 and output fiber port 564 preferably are aligned along a linear axis A, having equal core-to-core spacing represented by S, defining a switching plane; however, the spacing between output fiber port aperture 564 and its adjacent input fiber ports preferably is unequally spaced by an offset or space D (asymmetry) therebetween. In the preferred embodiment, input fiber port apertures 512, 514, 516, 518, 520, 522 and output fiber port aperture 564 have equal core-to-core spacing S of approximately 44 micrometers and offset D of approximately 6 micrometers (asymmetry) between output fiber port aperture 564 and the midpoint or center position between input fiber port apertures 514 and 516; thus, shifting output fiber port aperture 564 core or center position relative to its neighboring input fiber port aperture 514 and 516, without changing the position of apertures 512, 514, 516, 518, 520, or 522. Although the foregoing describes the preferred spacing, it should be recognized that input fiber port apertures 512, 514, 516, 518, 520, 522 and output fiber port aperture 564 may comprise alternate spacing to accommodate for particular optical switch design, configuration, and/or individual component requirements and mirror tilt or other switching capabilities. Furthermore, it should be recognized that any number of input fiber ports N (input fibers) may be utilized in fiber concentrator 52 for the purpose of increasing the fiber port (fiber) count of optical switch 10.

It is contemplated herein FIG. 5A, in an alternate embodiment of fiber array 52 that output fiber port aperture 564 midpoint or center position relative to either of its neighboring input fiber port apertures 514 and 516 may be shifted toward input fiber port aperture 516 with similar results.

It is contemplated herein that offset D may be either an increase in the distance between output fiber port aperture 564 midpoint, core-to-core spacing or center position relative to either of its neighboring input fiber ports or a decrease in the distance between output fiber port aperture 564 midpoint, core-to-core spacing or center position relative to either of its neighboring input fiber ports.

Figure 5B:
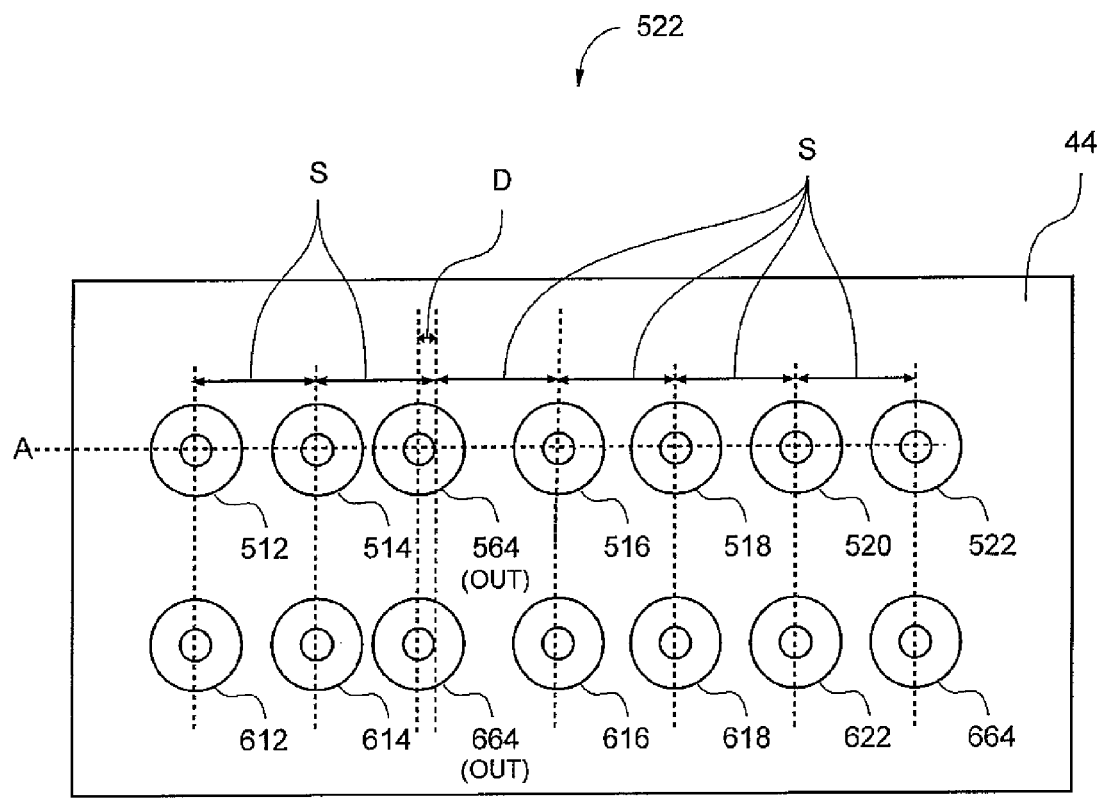
Figure 5C:
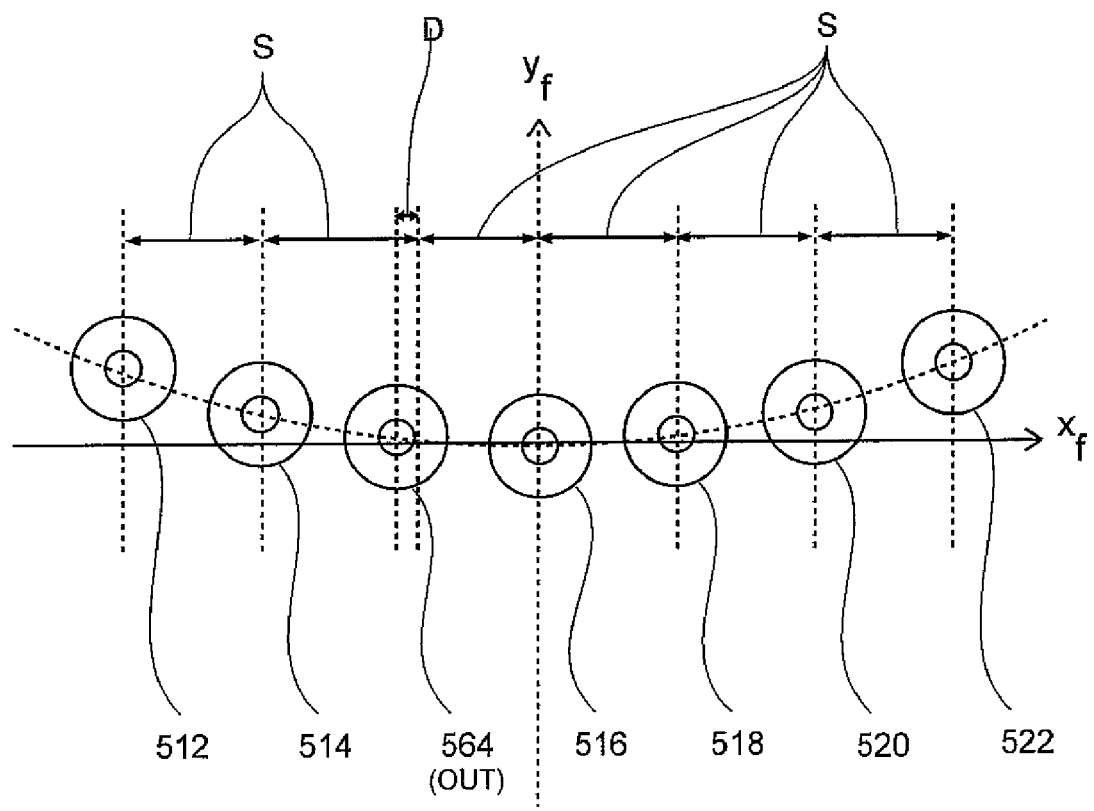
Figure 5D:
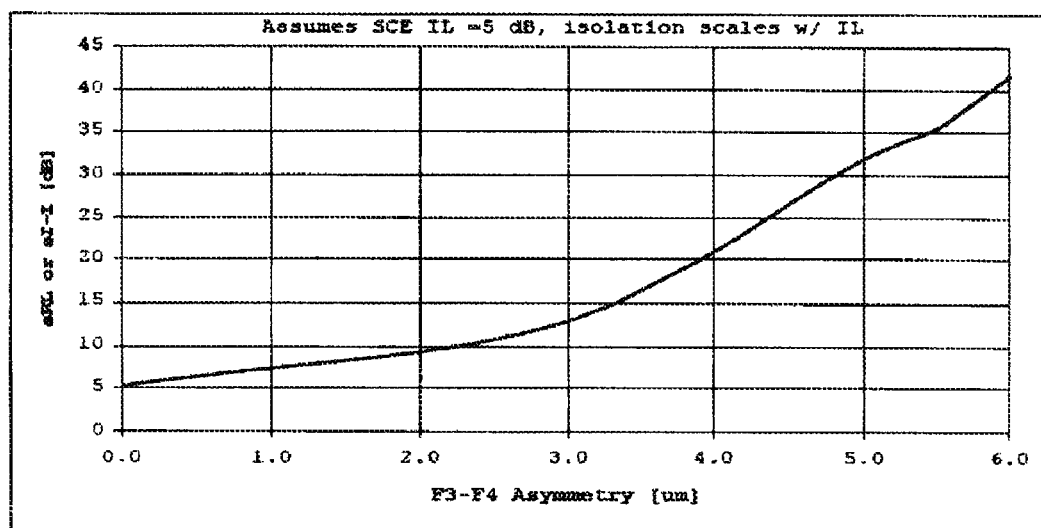
FIG. 5D is an x-y graph of the asymmetry offset and the static return loss or in-to-in isolation effects of a fiber concentrator array according to a preferred embodiment.

Computer modeling of preferred switch 10 using CODE V software reveals that an offset space D (asymmetry) of 6 micrometers between output fiber port aperture 564 and the midpoint or center position between input fiber apertures 514 and 516 produces approximately 40 dB of static return loss, and/or in-to-in crosstalk isolation on a per wavelength basis, see FIG. 5D In FIG. 5D, the x-axis represents the F3-F4 offset [μm], which is the offset space D (asymmetry) between output fiber port aperture 564 and the midpoint or center position between neighboring input fiber apertures 514 and 516. The y-axis sRL or sII [dB] represents static return loss or in-to-in isolation. From FIG. 5D CODE V software shows an increase in static return loss or in-to-in isolation, with increased offset space D (asymmetry). It is contemplated herein that beneficial static return loss or in-to-in crosstalk isolation effects occur with minimal offset space D (asymmetry), and such effects increase as space D is increased, specifically at 3, 4, 5, and 6 micrometers for offset space D. Moreover, it is contemplated herein that offset space D (asymmetry) creates a preferred isolation effect by shifting output fiber port aperture 564 midpoint or center position relative to its neighboring input fiber port apertures 514 and 516, that is, with output fiber port 564 closer to input port 514 than to 516.

In an alternate embodiment, it is contemplated herein that offset space D (asymmetry) creates a similar isolation effect by shifting output fiber port aperture 564 midpoint or center position relative to its neighboring input fiber ports 516, that is, with output fiber port 564 closer to input port 516 than to 514, with similar results.

Referring again to FIG. 5A, illustrated therein is an alternate embodiment, wherein the alternate embodiment of FIG. 5A is substantially equivalent in form and function to that of the preferred embodiment except as hereinafter specifically referenced. Specifically, alternate embodiment of FIG. 5A may be accomplished utilizing an N×1 bundle of optical fibers or a bundle of optical fibers housed in a ribbon aligned along a common axis A, the fiber terminations having symmetrical core-to-core spacing represented by S, and defining a switching plane; however, the spacing between output fiber 564 and its adjacent input fibers preferably is unequally spaced by an offset space D (asymmetry) therebetween.

In yet another alternate embodiment, illustrated in FIG. 5B optical switch 10 may include a two-dimensional fiber concentrator array 552, wherein multiplication of the fiber port count may be accomplished by selectively steering one or more wavelength components or optical signals to one of a plurality of columns of fiber ports within fiber concentrator array 552. FIG. 5B illustrates a first row of input fiber port apertures 512, 514, 516, 518, 520, 522 and output fiber port aperture 564 and second row of input fiber port apertures 612, 614, 616, 618, 620, 622 and output fiber port aperture 664. It is contemplated herein that two-dimensional fiber concentrator array 552 may have any number of rows and columns of fiber port apertures necessary to accommodate the network application, number of fiber ports or the capabilities of optical switch 10.

In an alternate embodiment, input fiber port apertures 512, 514, 516, 518, 520, 522 and output fiber port aperture 564 have equal core-to-core spacing S of approximately 44 micrometers and offset D of approximately 6 micrometers (asymmetry) between output fiber port aperture 564 and the midpoint or center position between input fiber port apertures 514 and 516 and input fiber port apertures 612, 614, 616, 618, 620, 622 and output fiber port aperture 664 have equal core-to-core spacing S of approximately 44 micrometers and offset D of approximately 6 micrometers (asymmetry) between output fiber port aperture 664 and the midpoint or center position between input fiber ports 614 and 616.

In yet another alternate embodiment, fiber concentrator array 552 or a bundle of fibers may be positioned along a curve as illustrated in FIG. 5C. The purpose of the curve is to compensate for slight excursions of the optical signal beams out of the switching plane defined by line $x_f$, brought about in designs in which the grating is positioned off of the system's optical axis. Input fiber ports 512, 514, 516, 518, 520, 522 and output fiber port 564 preferably are equally spaced along axis $x_f$, and have symmetrical $x_f$ axis core-to-core spacing represented by S; however, the $x_f$ axis spacing, midpoint or center position between output fiber port 564 and its adjacent input fiber ports preferably is unequally spaced by an offset space D (asymmetry) therebetween. Preferably, the curve on which the fiber cores reside is a function of $y_f=0.000205*x_f^2$; however, it is contemplated herein that other curved configurations may be utilized to reduce static and dynamic back reflection or in-to-in crosstalk.

It should be recognized that fiber concentrator 552 or similar bundled optical fibers, according to any one or more of the various preferred and/or alternate embodiments described herein, may be utilized to produce an asymmetrical fiber concentrator array (FCA) 552, wherein an offset in the front face 44 spacing of the output waveguide (output fiber) from its neighboring input waveguides (input fibers) functions to reduce or eliminate the introduction of static back reflection and static in-to-in crosstalk into an optical fiber by an optical switch, but does not impose the cost, complexity, and insertion loss penalties brought about by additional components.

Figure 6:
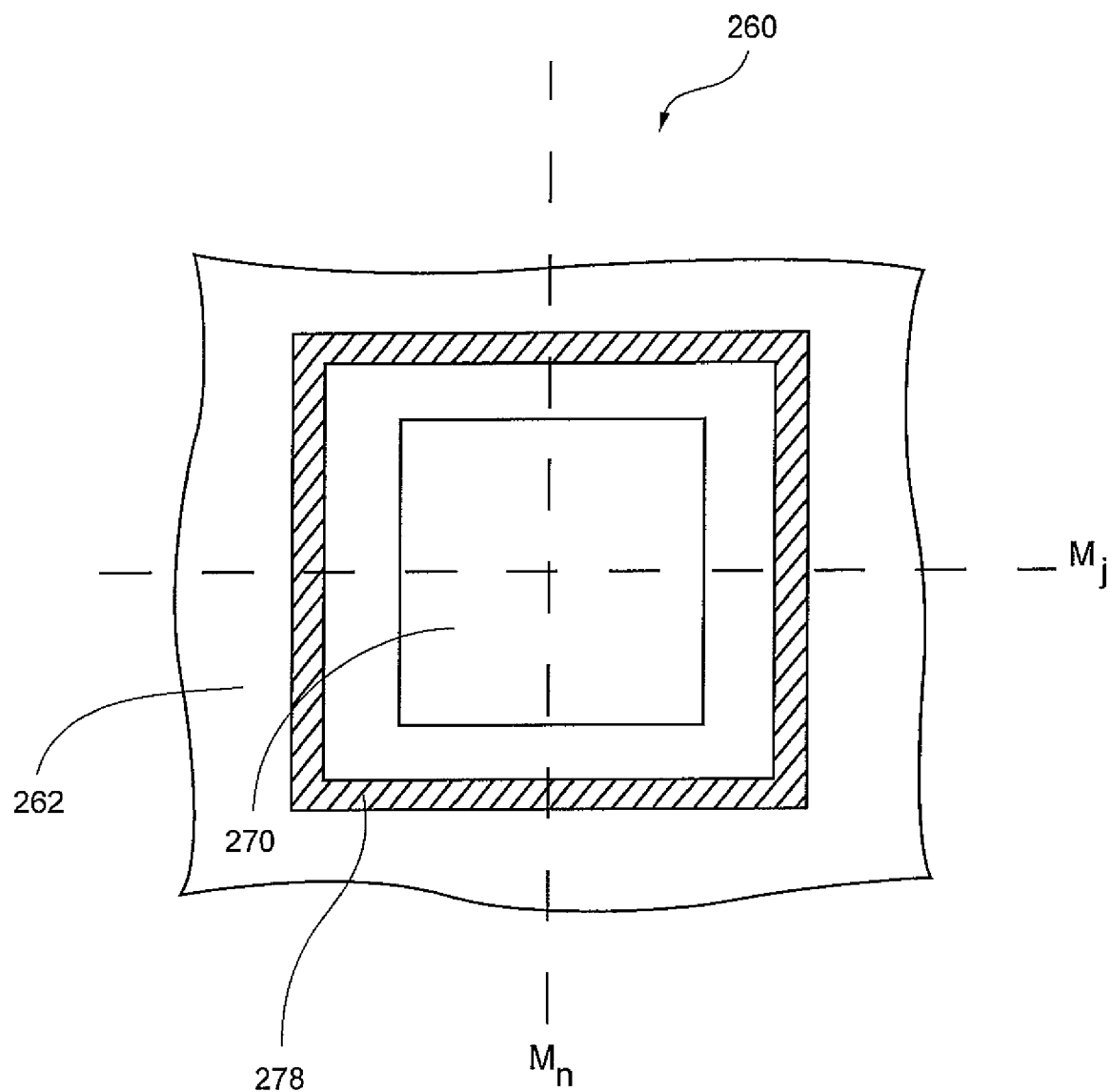
FIG. 6 is a plan view of a dual axis moveable mirror according to a preferred embodiment.

In FIG. 6 there is illustrated a top view of a dual axis moveable mirror wherein moveable means tilting, rotating, sliding or any other movement resulting in a change in the angle of reflection. Switching mirror array 72 (as seen in FIG. 1) is preferably formed as a one-dimensional array (preferably one row of approximately 40 mirrors, however, any number of mirrors is contemplated herein) of single-axis moveable mirrors, with one mirror illustrated as single cell (mirror) 260 in FIG. 6. Cell 260 is one of many such cells arranged typically in a one or two-dimensional array in a bonded structure preferably including multiple levels of silicon and oxide layers in what is referred to as multi-level silicon-on-insulator (SOI) structure. Cell 260 preferably includes frame 262. Cell 260 further includes reflective surface 270 twistably supported on frame 262. In one MEMS fabrication technique, the illustrated structure is integrally formed in an epitaxial (epi) layer of crystalline silicon. The process has been disclosed in U.S. Provisional Application, Ser. No. 60/260,749, filed Jan. 10, 2001, is incorporated herein by reference in its entirety. However, other fabrication processes resulting in somewhat different structures may be used without affecting or departing from the intended scope of the present invention.

In an alternate embodiment, optical switch 10 may include mirrors that can tilt on two axes, major axis Mj and minor axis Mn. Specifically, mirror 72 causes the switching beam to follow an offset path involving first, a minor axis Mn tilt in the wavelength direction away from the facial axis A, second, a major axis Mj tilt in the fiber direction parallel to axis A, and third, a minor axis Mn tilt toward the facial axis to steer the beam to become coincident with output fiber 564 while avoiding the intermediate waveguide(s). Such two axis mirrors resolves dynamic back reflection and in-to-in crosstalk by including optical switches utilizing dual-axis tilting mirror to eliminate momentarily produced dynamic crosstalk, as well as static back reflection or in-to-in crosstalk by utilizing the unequally spaced asymmetric fiber concentrator 552.

Referring now to FIGS. 7A-7F, there is illustrated a preferred optical switch diagram with reduced static back reflection, crosstalk and other stray light when utilizing an unequally spaced fiber port fiber concentrator array 52 or optical fiber bundle. For example, in FIG. 7A there is illustrated a switching configuration demonstrating reduced back reflection in comparison to FIG. 4A. When mirror 772 of optical switch 710 is configured to couple an input optical signal from input fiber port 1 712 to output 3 764, reduced or zero back reflection occurs in input fiber port 2 714 when mirror 772 is in its static state holding the switch position between input fiber port 1 412 and output fiber port 3 464. Specifically, the optical signal 998 from input fiber port 2 714 intentionally travels in free space to mirror 772 (in 1-3 fiber port position), reflects off mirror 772, and travels in free-space back to a position offset from input fiber port 2 714 due to an additional rotation of mirror 772 for the spacing offset introduced, between output fiber port 3 764 and its neighboring input fiber ports 2 714 and 4 712, thus compensating for the asymmetrical spacing of output 3 764, thereby resulting in reduced or zero back reflection of the optical signal from input fiber port 2 714 back on itself. The spacing offset introduced, between output fiber port 3 764 and its neighboring input fiber ports 2 714 and 4 712, causes the axis of symmetry 999 of the desired coupling angle to be different from the optical signal beam path from input fiber port 2 714. Mirror 772's surface is no longer perpendicular to fiber port 2 714's optical signal beam path. Thus optical signal beam 998 from input fiber port 2 714 reflects off of mirror 772 at an angle away from fiber port 2 714, and no substantial back reflection occurs. Desired optical signal routes for the 1-3 fiber port position include coupled fiber port 1-3 for FIG. 7A.

Figure 7A:
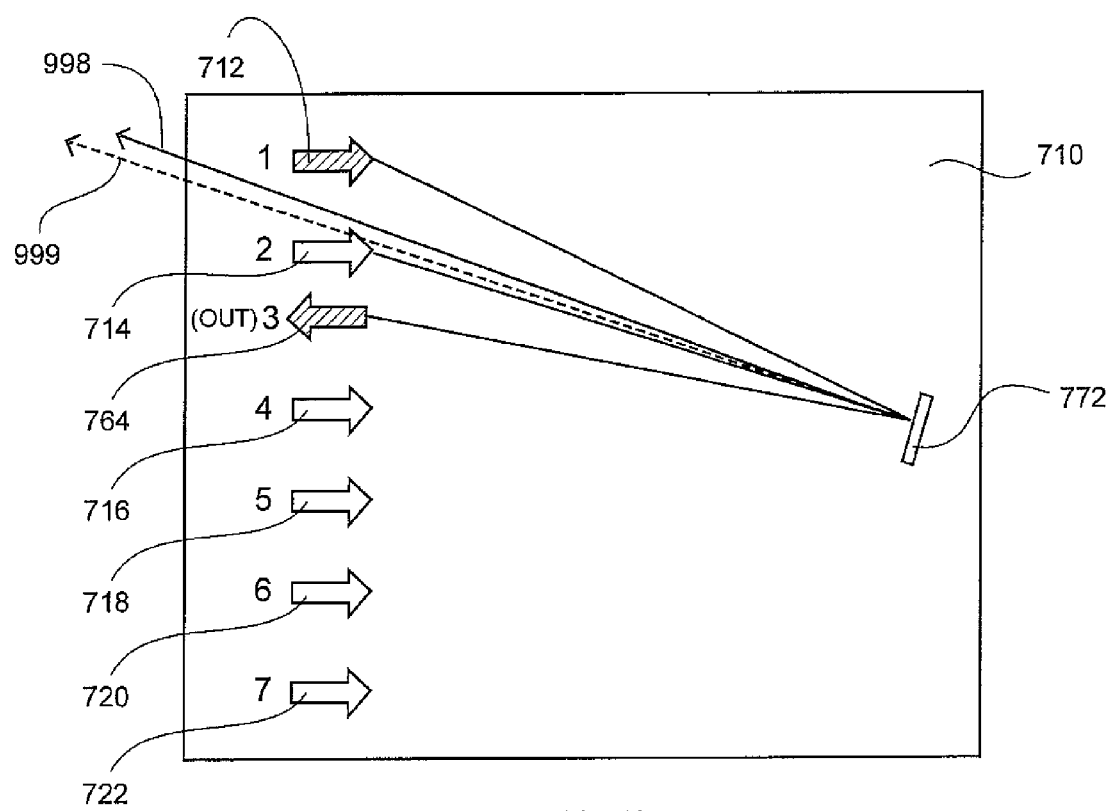
FIGS. 7A-7F is a diagram illustrating reduced static back reflection and static in-to-in crosstalk of an unequally spaced fiber port fiber concentrator array.
Figure 7B:
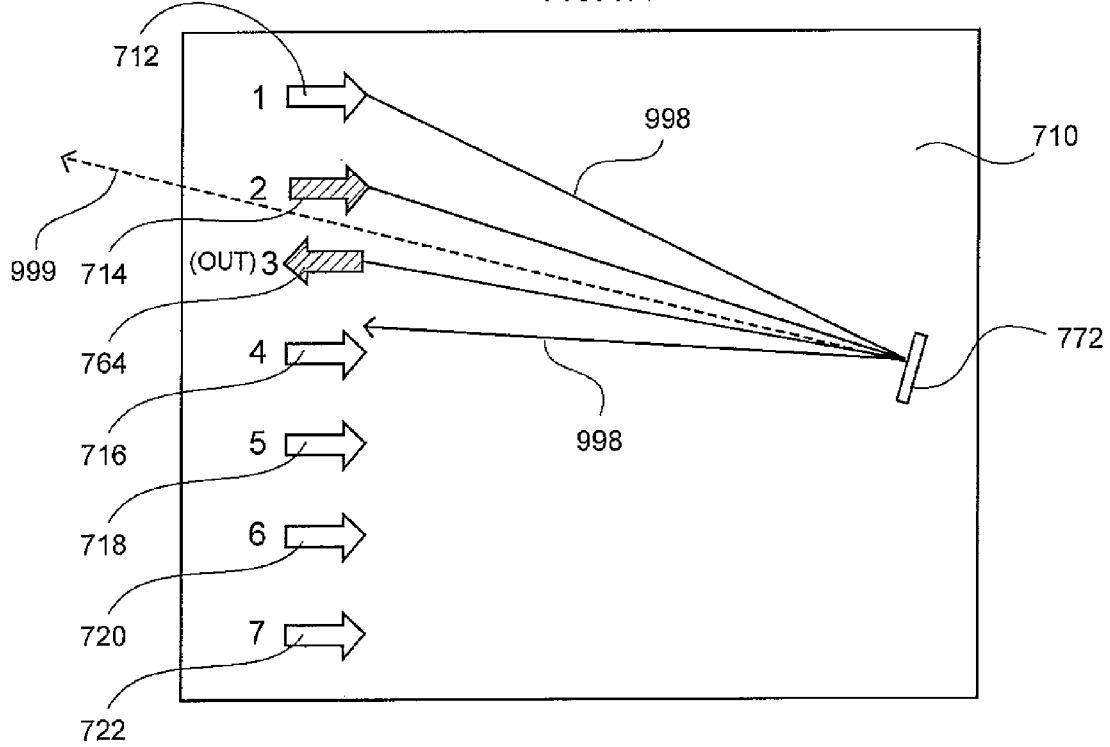

As a further example, in FIG. 7B there is illustrated a preferred switching configuration resulting in reduced in-to-in crosstalk. When mirror 772 of 6×1 optical switch 710 is configured to couple an input optical signal from input fiber port 2 714 to output 3 764, reduced or zero in-to-in crosstalk occurs between input fiber port 1 712 and input fiber port 4 716 while mirror 772 is in its static state holding the switch position between input fiber port 2 714 and output fiber port 3 764. Specifically, the optical signal 998 from input fiber port 1 712 intentionally travels in free space to mirror 772 (in the 2-3 fiber port position), reflects off mirror 772, and travels in free-space back to a position offset from input fiber port 4 716 due to an additional rotation of mirror 772 for the spacing offset introduced, between output fiber port 3 764 and its neighboring input fiber ports 2 714 and 4 712, thus compensating for the unequal spacing of output 3 764, thereby resulting in reduced or zero in-to-in crosstalk from input fiber port 1 712 to input fiber port 4 716. Likewise, the optical signal (not shown in FIG. 7B) from input fiber port 4 716 intentionally travels in free space to mirror 772 (in the 2-3 fiber port position), reflects off mirror 772, and travels in free-space back to a position offset from input fiber port 1 712, thereby resulting in reduced or zero in-to-in crosstalk from input fiber port 4 716 to input fiber port 1 712. The spacing offset introduced, between output fiber port 3 764 and its neighboring input fiber ports 2 714 and 4 716, causes the axis of symmetry 999 of the desired coupling angle between ports 2-3 to be different from the axis of symmetry of unwanted coupling angle between ports 1-4. Thus optical signal beam 998 from input fiber port 1 712 reflects off of mirror 772 at an angle too narrow to couple into input fiber port 4 716, and no substantial in-to-in crosstalk occurs. Similarly, an optical signal beam (not shown in FIG. 7B) from input fiber port 4 716 would reflect off of mirror 772 at an angle too wide to couple into input fiber port 1 712. Desired optical signal routes for the 2-3 fiber port position include coupled fiber ports 2-3 for FIG. 7B.

Figure 7C:
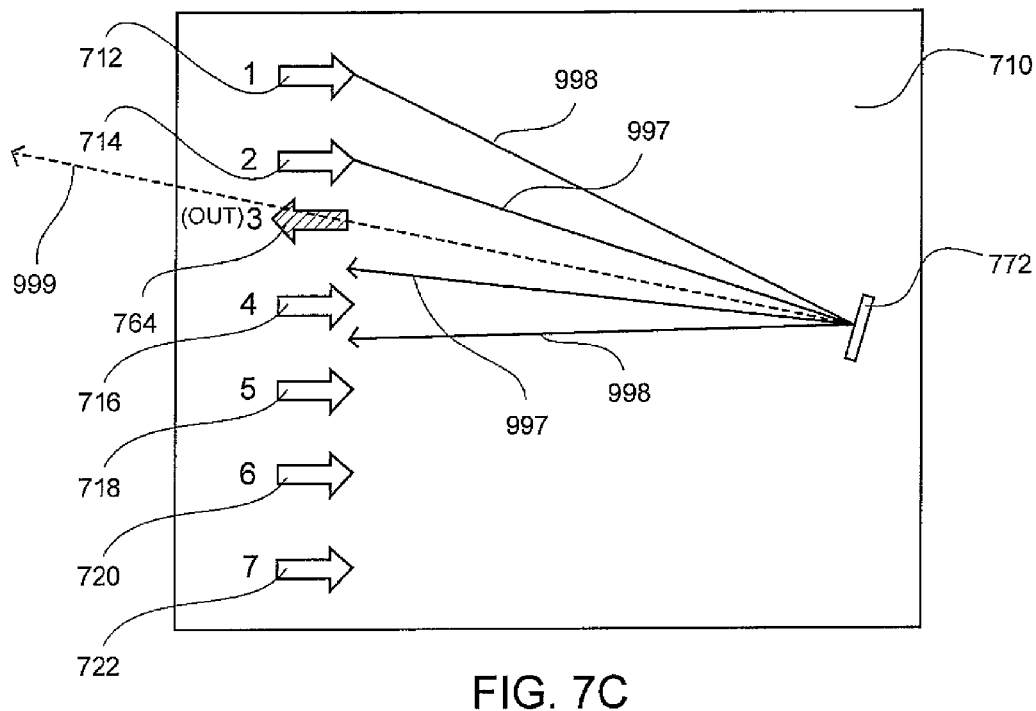

As still a further example, in FIG. 7C there is illustrated a preferred switching configuration resulting in reduced in-to-in crosstalk. When mirror 472 of 6×1 optical switch 710 is positioned in its intended non-switching (block) state, reduced or zero in-to-in crosstalk occurs between input fiber port 1 712 and input fiber port 5 718 and between input fiber port 2 714 and input fiber port 4 716. Specifically, the optical signal 998 from input fiber port 1 712 intentionally travels in free space to mirror 772 (in the block position), reflects off mirror 772, and travels in free-space back to a position offset from input fiber port 5 718 due to an additional rotation of mirror 772 for the spacing offset introduced, between output fiber port 3 764 and its neighboring input fiber ports 2 714 and 4 712, thus compensating for the unequal spacing of output 3 764, thereby resulting in reduced or zero in in-to-in crosstalk from input fiber port 1 712 to input fiber port 5 718. Likewise, the optical signal (not shown in FIG. 7C) from input fiber port 5 718 intentionally travels in free space to mirror 772 (in the neutral switch position), reflects off mirror 772, and travels in free-space back to a position offset from input fiber port 1 712 due to an additional rotation of mirror 772 for the spacing offset introduced, between output fiber port 3 764 and its neighboring input fiber ports 2 714 and 4 712, thus compensating for the unequal spacing of output 3 764, thereby resulting in reduced or zero in-to-in crosstalk from input fiber port 5 718 and input fiber port 1 712. Moreover, the optical signal 997 from input fiber port 2 712 intentionally travels in free space to mirror 772 (in the block position), reflects off mirror 772, and travels in free-space back to input fiber port 4 716 resulting reduced or zero in-to-in crosstalk from input fiber port 1 712 to input fiber port 4 716. Likewise, the optical signal (not shown in FIG. 7C) from input fiber port 4 716 intentionally travels in free space to mirror 772 (in the neutral switch position), reflects off mirror 772, and travels in free-space back to a position offset from input fiber port 2 714 due to an additional rotation of mirror 772 for the spacing offset introduced, between output fiber port 3 764 and its neighboring input fiber ports 2 714 and 4 712, thus compensating for the unequal spacing of output 3 764, thereby resulting in reduced or zero in-to-in crosstalk from input fiber port 4 716 to input fiber port 2 714. The spacing offset introduced, between output fiber port 3 764 and its neighboring input fiber ports 2 714 and 4 716, causes the axis of symmetry 999 of the desired blocking angle to be different from the axis of symmetry of unwanted coupling angles between ports 1-5 and ports 2-4. Thus optical signal beam 998 from input fiber port 1 712 reflects off of mirror 772 at an angle too narrow to couple into input fiber port 5 718, and no substantial in-to-in crosstalk occurs. Similarly, an optical signal beam (not shown in FIG. 7C) from input fiber port 5 718 similarly would reflect off of mirror 772 at an angle too wide to couple into input fiber port 1 712. A similar description applies to optical signal beam 997 and input fiber ports 2 714 and 4 716. The blocked position of mirror 772 has no desired optical signal routes.

Figure 7D:
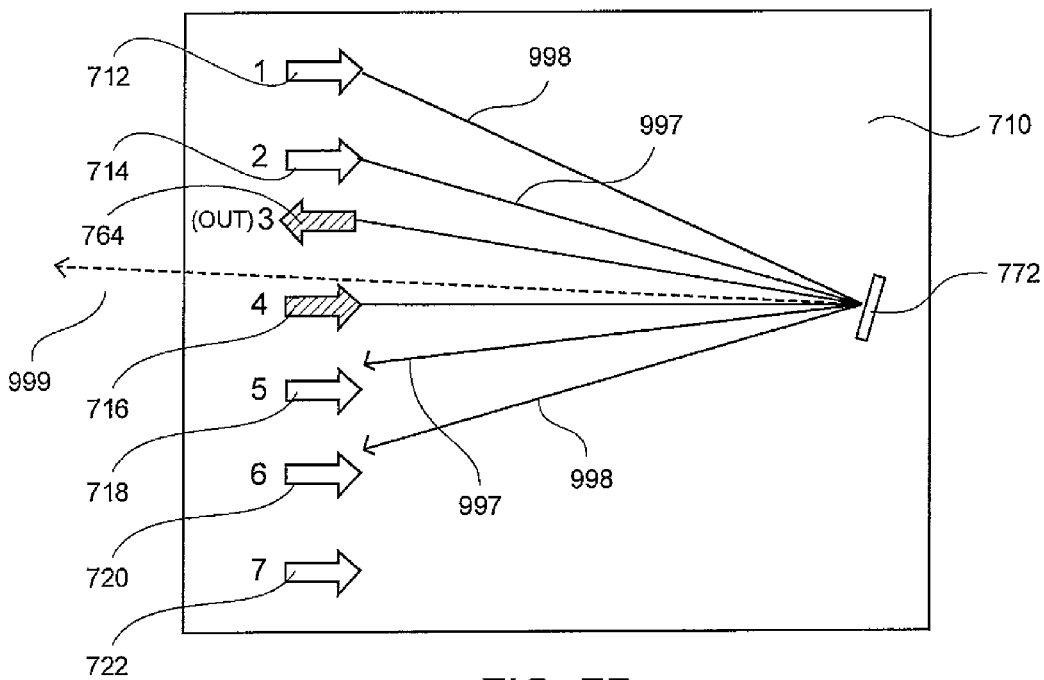

As yet another example, in FIG. 7D there is illustrated a switching configuration resulting in reduced in-to-in crosstalk. When mirror 772 of 6×1 optical switch 710 is configured to couple an input optical signal from input fiber port 4 716 to output fiber port 3 764, reduced or zero in-to-in crosstalk occurs between input fiber port 1 712 and input fiber port 6 720 while mirror 772 is in its static state holding the switch position between input fiber port 4 716 and output fiber port 3 764. Specifically, the optical signal 998 from input fiber port 1 712 intentionally travels in free space to mirror 772 (in the 4-3 fiber port position), reflects off mirror 772, and travels in free-space back to a position offset from input fiber port 6 720 due to an additional rotation of mirror 772 for the spacing offset introduced, between output fiber port 3 764 and its neighboring input fiber ports 2 714 and 4 712, thus compensating for the unequal spacing of output 3 764, thereby resulting in reduced or zero in-to-in crosstalk from input fiber port 1 712 to input fiber port 6 720. Likewise, the optical signal (not shown in FIG. 7D) from input fiber port 6 720 intentionally travels in free space to mirror 772 (in the 4-3 fiber port position), reflects off mirror 772, and travels in free-space back to a position offset from input fiber port 1 712 due to an additional rotation of mirror 772 compensating for the unequal spacing of output 3 764, thus resulting in reduced or zero in in-to-in crosstalk from input fiber port 6 720 and input fiber port 1 712. Moreover, the optical signal 997 from input fiber port 2 712 intentionally travels in free space to mirror 772 (in the 4-3 fiber port position), reflects off mirror 772, and travels in free-space back to a position offset from input fiber port 5 718 due to an additional rotation of mirror 772 for the spacing offset introduced, between output fiber port 3 764 and its neighboring input fiber ports 2 714 and 4 712, thus compensating for the unequal spacing of output 3 764, thereby resulting in reduced or zero in in-to-in crosstalk from input fiber port 2 714 to input fiber port 5 718. Likewise, the optical signal (not shown in FIG. 7D) from input fiber port 5 718 intentionally travels in free space to mirror 772 (in the 4-3 fiber port position), reflects off mirror 772, and travels in free-space back to a position offset from input fiber port 2 714 due to an additional rotation of mirror 772 compensating for the unequal spacing of output 3 764, thus resulting in reduced or zero in-to-in crosstalk between from fiber port 5 718 to input fiber port 2 714. The spacing offset introduced, between output fiber port 3 764 and its neighboring input fiber ports 2 714 and 4 716, causes the axis of symmetry 999 of the desired coupling angle between ports 4-3 to be different from the axis of symmetry of unwanted coupling angles between ports 1-6 and ports 2-5. Thus optical signal beam 998 from input fiber port 1 712 reflects off of mirror 772 at an angle too narrow to couple into input fiber port 6 720, and no substantial in-to-in crosstalk occurs. Similarly, an optical signal beam (not shown in FIG. 7D) from input fiber port 6 720 would reflect off of mirror 772 at an angle too wide to couple into input fiber port 1 712. A similar description applies to optical signal beam 997 and input fiber ports 2 714 and 5 718. The desired optical signal route for the 4-3 fiber port position includes coupled fiber ports 4-3 for FIG. 7D.

Figure 7E:
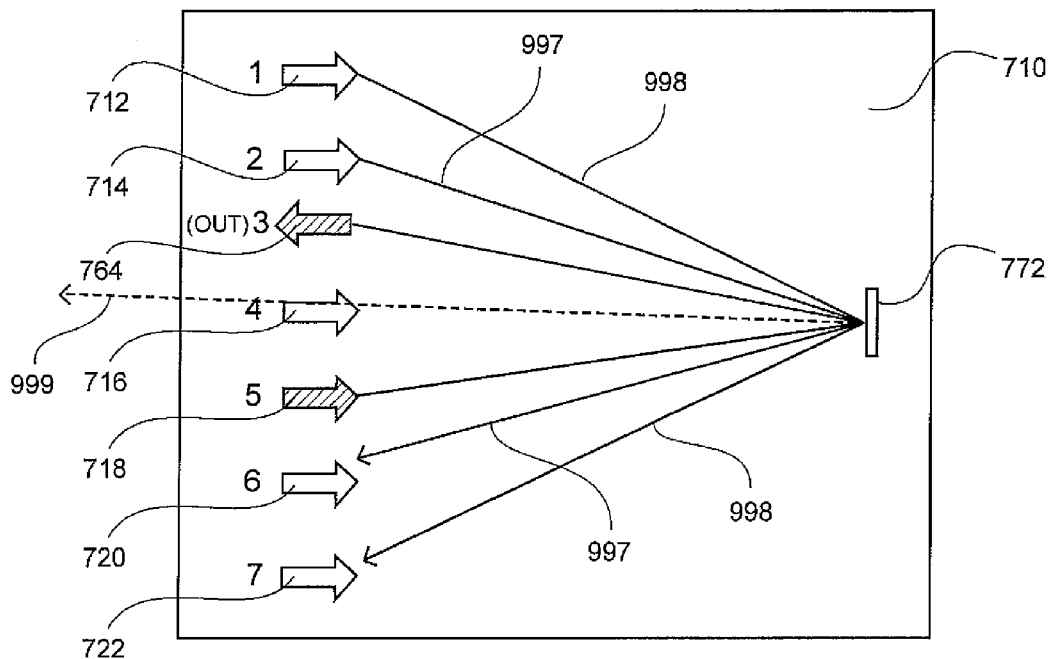

Yet another example, in FIG. 7E there is illustrated a switching configuration resulting in reduced in-to-in crosstalk. When mirror 772 of 6×1 optical switch 710 is configured to couple an input optical signal from input fiber port 5 718 to output 3 764, reduced or zero in-to-in crosstalk occurs between input fiber port 2 714 and input fiber port 6 720 and between input fiber port 1 712 and input fiber port 7 722 while mirror 772 is in its static state holding the switch position between input fiber port 5 718 and output fiber port 3 764. Additionally, reduced or zero static back reflection occurs on input fiber port 4 716. Specifically, the optical signal 997 from input fiber port 2 714 intentionally travels in free space to mirror 772 (in the 5-3 fiber port position), reflects off mirror 772, and travels in free-space back to a position offset from input fiber port 6 720 due to an additional rotation of mirror 772 for the spacing offset introduced, between output fiber port 3 764 and its neighboring input fiber ports 2 714 and 4 712, thus compensating for the unequal spacing of output 3 764, thereby resulting in reduced or zero in in-to-in crosstalk from input fiber port 2 714 to input fiber port 6 720. Likewise, the optical signal (not shown in FIG. 7E) from input fiber port 6 720 intentionally travels in free space to mirror 772 (in the 5-3 fiber port position), reflects off mirror 772, and travels in free-space back to a position offset from input fiber port 2 714 due to an additional rotation of mirror 772, thus compensating for the unequal spacing of output 3 764 and resulting in reduced or zero in in-to-in crosstalk from input fiber port 6 720 to input fiber port 2 714. Specifically, the optical signal 998 from input fiber port 1 712 intentionally travels in free space to mirror 772 (in the 5-3 fiber port position), reflects off mirror 772, and travels in free-space back to a position offset from input fiber port 7 722 due to an additional rotation of mirror 772 for the spacing offset introduced, between output fiber port 3 764 and its neighboring input fiber ports 2 714 and 4 712, thus compensating for the unequal spacing of output 3 764, thereby resulting in reduced or zero in in-to-in crosstalk from input fiber port 1 712 to input fiber port 7 722. Likewise, the optical signal (not shown in FIG. 7E) from input fiber port 7 722 intentionally travels in free space to mirror 772 (in the 5-3 fiber port position), reflects off mirror 772, and travels in free-space back to a position offset from input fiber port 1 712 due to an additional rotation of mirror 772, thus compensating for the unequal spacing of output 3 764 and resulting in reduced or zero in in-to-in crosstalk from input fiber port 7 722 to input fiber port 1 712. Moreover, when mirror 772 of 6×1 optical switch 710 is configured to couple an input optical signal from input fiber port 5 718 to output 3 764, reduced or zero back reflection occurs at input fiber port 4 716 while mirror 772 is in its static state holding the switch position between input fiber port 5 718 and output fiber port 3 764. Specifically, the optical signal from input fiber port 4 716 unintentionally travels in free space to mirror 772 (in 5-3 fiber port position), reflects off mirror 772, and travels in free-space back to a position offset from input fiber port 4 716 due to an additional rotation of mirror 772 for the spacing offset introduced, between output fiber port 3 764 and its neighboring input fiber ports 2 714 and 4 712, thus compensating for the unequal spacing of output 3 764, thereby resulting in reduced or zero back reflection of the optical signal from input fiber port 4 716 back on itself. The spacing offset introduced, between output fiber port 3 764 and its neighboring input fiber ports 2 714 and 4 716, causes the axis of symmetry 999 of the desired coupling angle between ports 5-3 to be different from the axis of symmetry of unwanted coupling angles between ports 2-6 and ports 1-7. Thus optical signal beam 998 from input fiber port 1 712 reflects off of mirror 772 at an angle too narrow to couple into input fiber port 7 722, and no substantial in-to-in crosstalk occurs. Similarly, an optical signal beam (not shown in FIG. 7E) from input fiber port 7 722 would reflect off of mirror 772 at an angle too wide to couple into input fiber port 1 712. A similar description applies to optical signal beam 997 and input fiber ports 2 714 and 6 720. The desired optical signal route for the 5-3 fiber port position includes ports 5-3 for FIG. 7E.

Figure 7F:
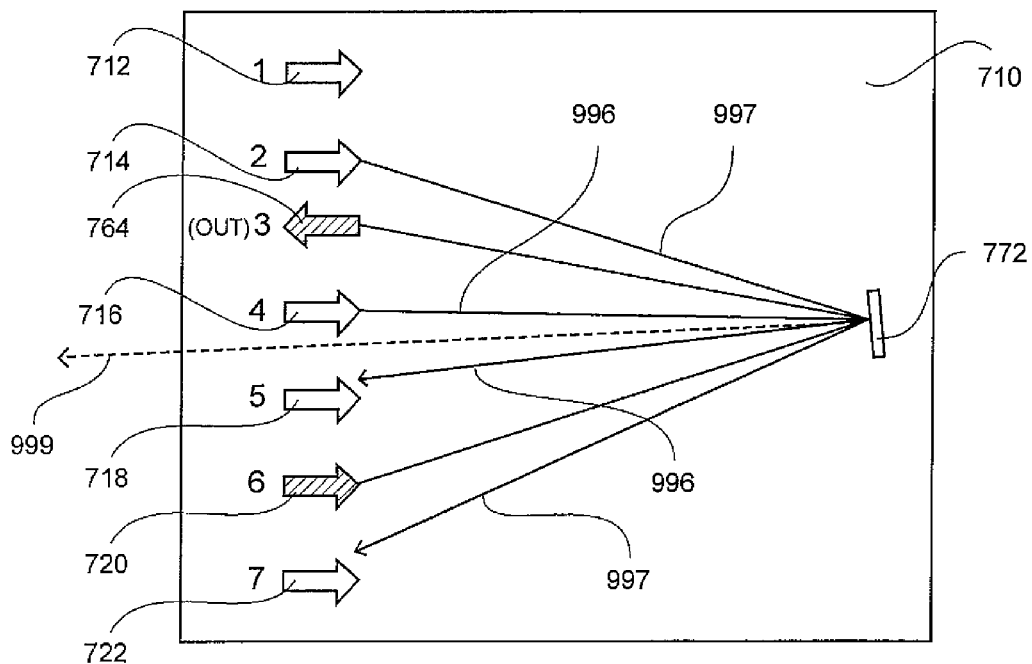

Yet another example, in FIG. 7F there is illustrated a switching configuration resulting in reduced in-to-in crosstalk. When mirror 772 of 6×1 optical switch 710 is configured to couple an input optical signal from input fiber port 6 720 to output 3 764, reduced or zero in-to-in crosstalk occurs between input fiber port 4 716 and input fiber port 5 718, and between input fiber port 2 714 and input fiber port 7 722 while mirror 772 is in its static state holding the switch position between input fiber port 6 720 and output fiber port 3 764. Specifically, the optical signal 996 from input fiber port 4 716 intentionally travels in free space to mirror 772 (in the 6-3 fiber port position), reflects off mirror 772, and travels in free-space back to a position offset from input fiber port 5 716 due to an additional rotation of mirror 772 for the spacing offset introduced, between output fiber port 3 764 and its neighboring input fiber ports 2 714 and 4 712, thus compensating for the unequal spacing of output 3 764, thereby resulting in reduced or zero in-to-in crosstalk from input fiber port 4 716 to input fiber port 5 718. Likewise, the optical signal (not shown in FIG. 7F) from input fiber port 5 418 intentionally travels in free space to mirror 472 (in the 6-3 fiber port position), reflects off mirror 472, and travels in free-space back to input fiber port 4 416 due to an additional rotation of mirror 772 compensating for the unequal spacing of output 3 764, thus resulting in reduced or zero in-to-in crosstalk from input fiber port 5 718 to input fiber port 4 716. Moreover, the optical signal 997 from input fiber port 2 714 intentionally travels in free space to mirror 772 (in the 6-3 fiber port position), reflects off mirror 772, and travels in free-space back to a position offset from input fiber port 7 722 due to an additional rotation of mirror 772 for the spacing offset introduced, between output fiber port 3 764 and its neighboring input fiber ports 2 714 and 4 712, thus compensating for the unequal spacing of output 3 764 and thereby resulting in reduced or zero in-to-in crosstalk from input fiber port 2 714 to input fiber port 7 722. Likewise, the optical signal (not shown in FIG. 7F) from input fiber port 7 722 intentionally travels in free space to mirror 772 (in the 6-3 fiber port position), reflects off mirror 772, and travels in free-space back to a position offset from input fiber port 2 714 due to an additional rotation of mirror 772 compensating for the unequal spacing of output 3 764, and thereby resulting in reduced or zero in-to-in crosstalk from input fiber port 7 722 to input fiber port 2 714. The spacing offset introduced, between output fiber port 3 764 and its neighboring input fiber ports 2 714 and 4 716, causes the axis of symmetry 999 of the desired coupling angle between ports 6-3 to be different from the axis of symmetry of unwanted coupling angles between ports 2-7 and ports 4-5. Thus optical signal beam 997 from input fiber port 2 715 reflects off of mirror 772 at an angle too narrow to couple into input fiber port 7 722, and no substantial in-to-in crosstalk occurs. Similarly, an optical signal beam (not shown in FIG. 7F) from input fiber port 7 722 would reflect off of mirror 772 at an angle too wide to couple into input fiber port 2 714. A similar description applies to optical signal beam 996 and input fiber ports 4 716 and 5 718. The desired optical signal route for the 6-3 fiber port position includes coupled fiber ports 6-3 for FIG. 7F.

Figure 8:
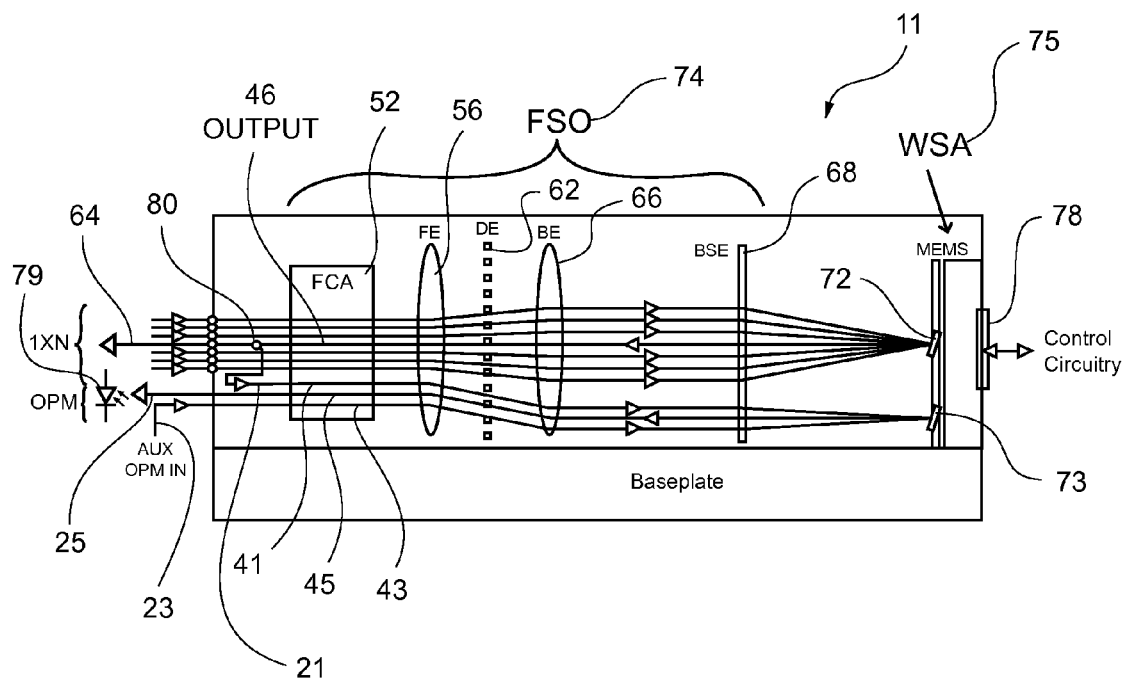
FIG. 8 is a schematic illustration of six input port by one output fiber port, dual channel MEMS mirror, output port taps, monitoring input fiber ports, monitoring output fiber port, and monitor wavelength cross-connect switch.

Referring now to FIG. 8, a schematic illustration of a six input fiber port by one output fiber port with integrated optical switching and monitoring system 11 is shown. Optical switching and monitoring system 11 preferably includes elements and configuration of switch 10 including six input fiber ports 12, 14, 16, 18, 20, 22, (same as FIG. 1) additional auxiliary monitoring fiber port 23, fiber concentrator array (FCA) 52, waveguides 32, 34, 36, 38, 40, 42 (same as FIG. 1), additional waveguides 41, 43 and 45, FSO 74 including front end optics (FE) 56, dispersive element 62, back end optics (BE) 66, beam steering element (BSE) 68, switching mirror array 72, control circuitry 78, WSA 75, output fiber port 64 and output monitoring fiber port 25.

According to a preferred embodiment of the invention, optical switching and monitoring system 11 is incorporated preferably by fabricating output tap 80 and waveguide 41 into fiber concentrator 52, whereby tap 80 preferably couples about 10% of the optical power from output fiber port 64 of waveguide 46 into waveguide 41 which directs the multi wavelength output beam to output from its aperture into free space and to propagate in a pattern having a central axis which is substantially parallel with the central axis of output apertures from waveguides 32, 34, 36, 38, 40, 42 (as shown in FIG. 1) in free space optics 74.

Alternatively, an optical switching and monitoring system with feedback monitoring of the output fiber may be implemented externally (off-board of the optical switching and monitoring system 11) by fusing or splicing the output fiber with a monitoring tap, or via use of a face plate connector and a splitter or jumper to couple about 10% of the optical power from output fiber port 64 fiber into monitoring fiber port 21, which is coupled to waveguide 41. Waveguide 41 outputs its multi-wavelength beam in free space propagating in a pattern having a central axis which is parallel with the central axis of outputs from waveguides 32, 34, 36, 38, 40 and 42 in free space optics 74.

Optical switching and monitoring system 11 preferably includes auxiliary monitoring fiber port 23, preferably coupled to waveguide 43, and preferably outputs its multi-wavelength beam in free space propagating in a pattern having a central axis which is parallel with the central axis of outputs from waveguides 32, 34, 36, 38, 40, 41, 42, in free space optics 74, thus enabling an auxiliary multi-wavelength beam to be monitored by optical switching and monitoring system 11. An external signal not found on input fiber ports 12, 14, 16, 18, 20, 22 may be input into auxiliary monitoring fiber port 23, and optical switching and monitoring system 11 may be utilized to monitor or read the power of each wavelength of a multi-wavelength beam input on auxiliary monitoring fiber port 23, and to output such data from optical power monitor 79 to a user interface. It is contemplated herein that more than one auxiliary monitoring port may be provided in a similar fashion.

Free space optics 74 preferably position the two multi-wavelength beams of monitoring fiber ports 21 and 23 propagating from waveguides 41 and 43 onto monitoring mirror array 73. Referring to FIG. 6 cell 260 preferably includes frame 262 and lateral gap 278 of switching mirror array 72. Cell 260 further includes reflective surface 270 twistably supported on frame 262. Cell 260 assigned to λ1 mirror of monitoring mirror array 73 tilts its reflective surface 270 (shown in FIG. 6), which has projected on it λ1(21) and λ1(23) from the two monitoring fiber ports 21 and 23, and by application of a control voltage by control circuitry 78 to monitoring mirror array 73, tilting reflective surface 270 selects λ1 either from monitoring fiber port 21 or 23 (the other λ1 being not selected is reflected away from the monitoring output waveguide 45) and the selected λ1 is preferably reflected to land precisely at the center of concentrator waveguide 45 associated with the particular output monitoring fiber port 25 after retracing its path through free space optics 74.

Optical switching and monitoring system 11 is capable of simultaneously switching one selected λ1 from input fiber ports 12-22 to output fiber port 64 and blocking the remaining unselected λ1(s) from input fiber ports 12-22, and so forth for λ2-λn, and switching one selected λ from monitoring fiber ports 21 and 23 to output monitoring fiber port 25 and blocking the remaining unselected λ from monitoring fiber ports 21 or 23 as well as all other λs from monitoring fiber ports 21 and 23 and so forth for λ2-λn individually. Output monitoring fiber port 25 preferably receives the selected single wavelength λ switched by MEMS mirror array 73 (row B) after it has passed through free space optics 74. Output monitoring fiber port 25 preferably is coupled to optical power monitor 79.

Power monitor (optical measurement device) 79 preferably is a photodiode, preferably measuring the power level of wavelength λn switched by monitoring mirror array 73 (row B), measuring one wavelength at a time. As monitoring mirror array 73 (row B) selects wavelength λn and routes it to waveguide 45 coupled to output monitoring fiber port 25, power monitor 79 preferably measures the power of such wavelength λn. Alternatively, power monitor 79 may be any type of optical measuring device, for example a device capable of measuring power of one or more wavelengths by scanning the multi-wavelength components, determining signal to noise ratios by spectrum analyzing the wavelength bandwidth, measuring wavelength, measuring polarization-dependent properties, and the like. The optical intensities for all wavelength-separated signals are preferably converted to analog or digital electronic signals by power monitor 79 and supplied to control circuitry 78, which preferably adjusts switching mirror array 72 as set forth herein to adjust the power of wavelength λn to conform to one or more predetermined criteria.

Beam steering element 68 preferably refracts wavelength-separated beams from back end optics 66 and steers such beams onto switching mirror array 72 or switching mirror 73 based on the refractive indices of each segment, whether focusing all switching λn beams from input fiber ports 12, 14, 16, 18, 20, 22 on a λn mirror of switching mirror array 72, or focusing some switching λn beams onto one mirror and other switching λn beams on another mirror or a mirror in a different row of an array of mirrors, or focusing all monitoring λn beams from auxiliary monitoring fiber port 23 and monitoring fiber ports 21 on a λn mirror of switching mirror array 73, or focusing some monitoring λn beams onto one mirror and other monitoring λn beams on another mirror or a mirror in a different row of an array of mirrors.

Beam steering element 68 (or segmented prism element, one possible type of steering element) refracts λn from each input port 12, 14, 16, 18, 20, 22 onto λn mirror of switching mirror array 72 assigned to λn. For example, preferably λ1 mirror of switching mirror array 72 has λ1(12) through λ1(22) from all input fiber ports 12-22 projected onto the λ1 mirror surface via beam steering element 68, and by moving, rotating or tilting λ1 mirror of MEMS switching mirror array 72, wavelength selective switch 10 preferably switches one selected λ1 (12-22) from input fiber ports 12-22 to output fiber port 64 and blocks the remaining unselected λ1(s) from input fiber ports 12-22, and so forth for λ2-λn. Each λn mirror of switching mirror array 72, in this example, preferably has six input beams projected simultaneously onto the surface of such mirror, all at wavelength λn, wherein those six beams are preferably demultiplexed and focused by free space optics 74 from input fiber ports 12, 14, 16, 18, 20, respectively. It should be recognized that utilizing beam steering element 68 enables refracting and/or steering of multiple wavelengths onto a single mirror from one or more input fiber ports 12-22, or refracting light to any arbitrary point, versus prior art switches, which use lenses or mirrors to focus individual wavelengths and are constrained to focus onto the lens or mirror's focal point. Further, it should be recognized that utilizing beam steering element 68 enables the potential elimination of lenslets for each optical fiber port, thereby reducing the number of elements and the overall cost of the switch.

Beam steering element 68 (or segmented prism element, one possible type of steering element) refracts λn from each auxiliary monitoring fiber port 23 and monitoring fiber ports 21 onto λn mirror of switching mirror array 73 assigned to λn. For example, preferably λ1 mirror of switching mirror array 73 has λ1(21) and λ1(23) from both monitoring fiber ports 21 and 23 projected onto the λ1 mirror surface 270 via beam steering element 68, and by moving, rotating or tilting λ1 mirror of MEMS switching mirror array 73, wavelength selective switch 10 preferably switches one selected λ1(21) or λ1(23) from monitoring fiber ports 21 or 23 to output monitoring fiber port 25 and blocks the remaining unselected λ1 from monitoring fiber ports 21 or 23, and so forth for λ2-λn. Each λn mirror of switching mirror array 73, in this example, preferably has two monitoring beams projected simultaneously onto the surface 270 of such mirror, all at wavelength λn, wherein those two beams are preferably demultiplexed and focused by free space optics 74 from input monitoring fiber ports 21 and 23, respectively. It should be recognized that utilizing beam steering element 68 enables refracting and/or steering of multiple wavelengths onto a single mirror from one or more input fiber ports 12-22, monitoring fiber ports 21 and 23 or refracting light to any arbitrary point, versus prior art switches, which use lenses or mirrors to focus individual wavelengths and are constrained to focus onto the lens or mirror's focal point. Further, it should be recognized that utilizing beam steering element 68 enables the potential elimination of lenslets for each optical fiber port, thereby reducing the number of elements and the overall cost of the switch.

Other forms of power monitoring are possible as long as the time necessary for resolutions of differences in wavelength channel power levels is sufficient for power adjustments. If the adjustments are intended to only address aging and environmental effects, the resolved measurement time may be relatively long. On the other hand, fast feedback may be necessary for initializing switch states, for compensating for transient changes in power level such as occur from the combination of polarization-dependent loss and polarization fluctuations which vary at the wavelength level, for stabilizing against vibration, for alarm signaling to protection circuitry, and for network fault recovery. Moreover, by replacing photodetector 79 with other commercially available devices, other parameters may be measured, such as optical signal to noise ratio (OSNR), center wavelength, transient behavior, or bit error rate.

Moreover, various configurations of optical switching and monitoring system 11 are contemplated herein, including taps or splitters for all or a selected number of input and output fiber ports, including their associated waveguide, free space optics, MEMS mirrors and the like.

It is contemplated in an alternate embodiment that optical switching and monitoring system 11 allows for N×1 or more; specifically, the six input fiber ports 12, 14, 16, 18, 20, 22, additional auxiliary monitoring fiber port 23, output fiber port 64 and output monitoring fiber port 25 may be interleaved or intermixed. Included in the alternate embodiment optical switching and monitoring system 11 are waveguides 32, 34, 36, 38, 40, 42, additional waveguides 41, 43 and 45, FSO 74 including front end optics (FE) 56, dispersive element 62, back end optics (BE) 66, beam steering element (BSE) 68, switching mirror array 72, control circuitry 78, and WSA 75.

Furthermore, it is contemplated herein in the above examples that an optical system may comprise two or more optical switches 10, 11 and method for co-packaging two or more optical switches 10, 11. For example, an optical system may comprise two or more optical switches co-packaged together comprising discrete sets of input fiber ports (N per set) and an output fiber port (1 per set), and wherein λn from the set of multiple input fiber ports (N) is focused on λn mirror via the use of shared free space optics such as one or more shared beam steering elements, one or more dispersive elements, and one or more optical elements, wherein the one or more beam steering elements steers, one or more λn from any point in the optical path to any other point, and one or more discrete arrays of micro electromechanical system (MEMS) mirrors in a shared array, wherein at least a first array of MEMS mirrors is utilized to select and switch selected wavelengths from the first set of input fiber ports (N) to an output fiber port of the same set, and wherein at least a second array of MEMS mirrors using and sharing the same free space optics as the first MEMS array is utilized to produce yet another fiber optic switch, enabling a cost effective, high level of integration of one or more N×1, or alternatively one or more 1×N co-packaged optical switching system, as disclosed in United States Non-Provisional patent application entitled "BEAM STEERING ELEMENT AND ASSOCIATED METHODS FOR MANIFOLD FIBEROPTIC SWITCHES," filed on Oct. 18, 2007, having assigned Ser. No. 11/975,242 incorporated herein by reference in its entirety.

Further the present system and method may include an optical system comprising two or more mixed and/or similar combination optical switches co-packaged together comprising discrete sets of fiber ports, each optical switch configured either with N input fiber ports and 1 output fiber port (N×1 optical switch) or with 1 input fiber port and N output fiber ports (1×N optical switch), and wherein λn from the input fiber ports is focused on λn mirror via the use of shared free space optics, such as one or more shared beam steering elements, one or more dispersive elements, and one or more optical elements, wherein the one or more steering elements steers one or more λn from any point in the optical path to any other point; and with one or more discrete sub-arrays of micro electromechanical system (MEMS) mirrors in a shared array, wherein at least a first array of MEMS mirrors is utilized to select and switch selected wavelengths from the input fiber port(s) to an output fiber port(s) of a first optical switch, and wherein at least a second array of MEMS mirrors using and sharing the same free space optics as the first MEMS array is utilized to select and switch selected wavelengths between input and output fiber ports belonging to one other optical switch, wherein the second optical switch may be utilized to select individual wavelengths or spectral components from its input fiber ports to send to its output fiber port for optical power or other monitoring purposes, and wherein output fiber ports from one set can be coupled to input ports of other sets, thus, enabling a cost effective, high level of integration of one or more N×1, or alternatively one or more 1×N, co-packaged optical switching system, one or more N×M co-packaged optical switching system, wherein N and M are greater than or equal to 1, and one or more N×1, or alternatively one or more 1×N switches capable of internal feedback monitoring and dynamic insertion loss control of a switching node in telecommunication networks as disclosed in Patent Cooperation Treaty patent application entitled "BEAM STEERING ELEMENT AND ASSOCIATED METHODS FOR MANIFOLD FIBEROPTIC SWITCHES," filed on Oct. 31, 2007, having assigned Ser. No. PCT/US07/22955 incorporated herein by reference in its entirety.

The invention, however, is not intended to be limited to the specific terminology so selected, and it is to be understood that each specific element includes all technical equivalents that operate in a similar manner to accomplish a similar purpose.

The use of 'a' or 'an' in the following claims is to be interpreted as does not require more than one but it permits more than one. In addition the use of "array" herein includes one and more than one row.

Having thus described exemplary embodiments of the present invention, it should be noted by those skilled in the art that the within disclosures are exemplary only and that various other alternatives, adaptations, and modifications may be made within the scope and spirit of the present invention. Accordingly, the present invention is not limited to the specific embodiments as illustrated herein, but is only limited by the following claims.

What is claimed is at least:

1. An optical device comprising:
a guiding member for guiding optical signals, said optical signals constituting a work piece;
a first array of apertures disposed on at least one side of said guiding member and serving as an interface for connecting one or more input fibers and one or more output fibers to said guiding member;
a second array of apertures disposed on another side of said guiding member and serving as a free-space interface for optical signals of said one or more input fibers and said one or more output fibers; and
three or more waveguides, wherein each said waveguide connects at least one aperture of said first array of apertures to at least one aperture of said second array of apertures,
wherein said apertures of said second array of apertures are predominately equally spaced relative to one another, and
wherein one or more apertures of said second array of apertures, corresponding to said one or more output fibers, has unequal spacing relative to said predominately equally spaced apertures of said second array.

2. The device of claim 1, wherein said one or more input fibers and said one output fiber lie substantially in a common plane.

3. The device of claim 1, wherein said second array of apertures lie substantially in a common plane.

4. The device of claim 1, wherein said unequal spacing is approximately 6 microns offset relative to said predominately equally spaced adjacent apertures.

5. The device of claim 1, wherein said second array of apertures are substantially aligned with one another.

6. The device of claim 1, wherein said first array of apertures has wider aperture spacing than said second array of apertures.

7. The device of claim 1, wherein said second array of apertures is arranged as a plurality of rows.

8. The device of claim 1, wherein said first array of apertures is arranged as a plurality of rows.

9. The device of claim 1, wherein said three or more waveguides are selected from a group consisting of stripped portions of said fibers, planar waveguides, extruded waveguides, silicon dioxide waveguides, silicon nitride waveguides, silicon oxynitride waveguides, aluminosilicate waveguides, chalcogenide waveguides, photonic crystal waveguides, holey waveguides, plastic waveguides, glass waveguides and combinations thereof.

10. The device of claim 1, wherein said second array of apertures is arranged in a parabolic pattern.

11. An optical system comprising:
a guiding member comprising a first array of apertures disposed on at least one side of said guiding member and serving as an interface for connecting one or more input fibers and one or more output fibers to said guiding member, a second array of apertures disposed on another side of said guiding member and serving as a free-space interface for optical signals of said one or more input fibers and said one or more output fibers, and three or more waveguides, wherein each said waveguide connects at least one aperture of said first array of apertures to at least one aperture of said second array of apertures, wherein said apertures of said second array of apertures are predominately equally spaced relative to one another, wherein one or more said apertures of said second array of apertures, corresponding to said one or more output fibers, has unequal spacing relative to said predominately equally spaced apertures;
a switching element for receiving at least one of the optical signals from said one or more input fiber ports and for switching at least one of the optical signals from one of said one or more input fiber ports to said one or more output fiber ports according to a state of said switching element; and one or more optical elements, wherein each said optical element focuses the optical signals of said one or more input fiber ports and said one or more output fiber ports.

12. The optical system of claim 11, further comprising a wavelength dispersive element for spatially separating at least one wavelength of the input optical signal from at least one other wavelength of the input optical signal and for recombining at least one wavelength of the output optical signal with at least one other wavelength of the output optical signal.

13. The optical system of claim 12, wherein said switching element for receiving at least one wavelength from said one or more input fiber ports and for switching at least one wavelength from one of said one or more input fiber ports to said one or more output fiber ports according to a state of said switching element.

14. The optical system of claim 12, further comprising at least one steering element for steering the at least one wavelength from any of said one or more input fiber ports onto said switching element, and for steering the at least one wavelength from said switching element to any of said one or more output fiber ports.

15. The optical system of claim 11, wherein said one or more input fibers and said one or more output fibers lie substantially in a common plane.

16. The optical system of claim 11, wherein said second array of apertures lie substantially in a common plane.

17. The optical system of claim 11, wherein said unequal spacing is approximately 6 microns offset relative to said predominately equally spaced adjacent apertures.

18. The optical system of claim 11, wherein said apertures of said second array of apertures are substantially aligned with one another.

19. The optical system of claim 11, wherein said first array of apertures has wider spacing between said apertures than said second array of apertures.

20. The optical system of claim 11, wherein said second array of apertures is arranged in a parabolic pattern.

21. A method for making an asymmetrical fiber concentrator array, said method comprising the steps of:
  forming in a guiding member a first array of apertures disposed on at least one side of said guiding member, wherein said first array of apertures serves as an interface for connecting one or more input fibers and one or more output fibers to said guiding member;
  forming in said guiding member a second array of apertures disposed on another side of said guiding member, wherein said second array of apertures serves as a free-space interface for optical signals of said one or more input fibers and said one or more output fibers; and
  filling said guiding member with three or more waveguides, wherein each said waveguide connects said at least one aperture of said first array of apertures with said at least one aperture of said second array of apertures;
  wherein said apertures of said second array are predominately equally spaced relative to one another, and
  wherein one or more apertures of said second array of apertures has unequal spacing relative to said predominately equally spaced apertures, said one or more unequally spaced apertures corresponding to said one or more output fibers.

22. The method of claim 21, further comprising the step of connecting said one or more input fibers and said one or more output fibers to said apertures of said first array.

23. The method of claim 21, further comprising the step of forming said apertures of said second array of apertures substantially in a common plane.

24. The method of claim 21, wherein said unequal spacing is approximately 6 microns offset relative to said predominately equally spaced adjacent apertures.

25. The method of claim 21, further comprising the step of forming said apertures of said second array of apertures in substantial alignment with one another.

26. The method of claim 21, further comprising the step of forming said first array of apertures having wider aperture spacing than said second array of apertures.

27. The method of claim 21, further comprising the step of forming said apertures of said second array of apertures in a plurality of rows.

28. The method of claim 21, further comprising the step of forming said apertures of said first array of apertures in a plurality of rows.

29. The method of claim 21, further comprising the step of forming said second array of apertures in a parabolic pattern.

30. A method for increasing static return loss, reducing static back reflection, reducing static in-to-in crosstalk in an optical switch, said method comprising the steps of:
  providing a guiding member comprising: a first array of apertures disposed on at least one side of said guiding member, wherein said first array of apertures serves as an interface for connecting one or more input fibers and one or more output fibers to said guiding member, a second array of apertures disposed on another side of said guiding member, wherein said second array of apertures serves as a free-space interface for optical signals of said one or more input fibers and said one or more output fibers, three or more waveguides, wherein each said waveguide connects at least one aperture of said first array of apertures to at least one aperture of said second array of apertures;
  spacing said second array of apertures predominately equally relative to one another;
  spacing at least one aperture of said second array of apertures corresponding to said one or more output fibers unequally relative to said predominately equally spaced apertures;
  transmitting in free-space one or more optical signals of said one or more input fibers to an optical switching element;
  switching at least one optical signal of said one or more optical signals of said one or more input apertures to said one or more output apertures; and
  receiving an optical signal from said optical switching element for transmission to said one or more output fibers.

31. The method of claim 30, further comprising the step of dispersing spectrally and spatially at least one wavelength of the optical signals from at least one other wavelength of the optical signals from any of said one or more input fiber ports and recombining at least one wavelength of the optical signals with at least one other wavelength of the optical signals from any of said one or more output fiber ports.

32. The method of claim 31, further comprising the step of steering said at least one wavelength from any of said one or more input fiber ports onto said switching element, and for steering the at least one wavelength from said switching element to said one or more output fiber ports.

33. The method of claim 30, further comprising the step of connecting said one or more input fibers and said one or more output fibers to said apertures of said first array.

34. The method of claim 30, further comprising the step of forming said second array of apertures substantially in a common plane.

35. The method of claim 30, wherein said unequal spacing is approximately 6 microns offset relative to said predominately equally spaced adjacent apertures.

36. The method of claim 30, further comprising the step of forming said second array of apertures in substantial alignment with one another.

37. The method of claim 30, further comprising the step of forming said first array of apertures having wider spacing than said second array of apertures.

38. The method of claim 30, further comprising the step of forming said apertures of said second array of apertures in a plurality of rows.

39. The method of claim 30, further comprising the step of forming said apertures of said first array of apertures in a plurality of rows.

40. The method of claim 30, further comprising the step of forming said second array of apertures in a parabolic pattern.

* * * * *